United States Patent Office 3,211,652
Patented Oct. 12, 1965

---

3,211,652
PHENOLIC COMPOSITIONS
James B. Hinkamp, Birmingham, Mich., assignor to Ethyl Corporation, New York, N.Y., a corporation of Virginia
No Drawing. Filed Dec. 3, 1962, Ser. No. 241,565
18 Claims. (Cl. 252—49.8)

This application is a continuation-in-part of application Serial No. 804,131, entitled "Antioxidants," filed April 6, 1959 and now abandoned.

This invention relates to phenolic antioxidants and more particularly to mixtures of methylenebis phenol compounds containing substantial amounts of asymmetric methylenebis phenols, their preparation and use in a wide variety of organic material.

Certain methylenebis phenols have been shown to have outstanding antioxidant properties in a variety of organic media. All such phenols used commercially have two characteristics—their structures are symmetrical and to achieve their effectiveness they are used in a relatively pure state; that is, as a discreet compound. Previous attempts to use mixtures of methylenebis phenols have not met with success and such mixtures have not received commercial acceptance. The desirability of using such mixtures where they would be commercially acceptable is obvious since a large factor in the cost of prior antioxidants has been the cost of separation procedures used to isolate the discreet compound. Since cost is a large factor in determining the commercial acceptance of an antioxidant material, the fact that no prior mixture of methylenebis phenols has met with commercial success is further testimony as to the general lack of effectiveness of such mixtures.

In spite of this general finding that mixtures of methylenebis phenols are unsuitable for commercialization, the search has continued. The incentives for such a search are great since finding such a mixture would allow considerable savings in the cost of effective antioxidant protection. Clearly then, the discovery of such a mixture would be a major break-through in antioxidant research and a great advance over the art. The invention described in the present application represents such an advance over the art. This application describes an invention which possesses all of the desirable properties discussed above as well as additional beneficial properties not possessed by other prior antioxidants. The compositions disclosed and claimed in this application are mixtures of methylenebis phenols and contain substantially amounts of asymmetric methylenebis phenols. Among the beneficial attributes of the compositions of this invention are their inexpensiveness, tremendous antioxidant potency, superior stabilization of lubricating oil, superior solubility in lubricating oil, water and caustic insolubility, lack of toxicity, stability in storage and handling, surprising and beneficial effect on combustion chamber deposits and exhaust emissions when used in gasoline, lack of deleterious color formation, mobility and fluidity at ordinary temperatures, simplicity of preparation, compatibility and cooperation with other lubricating oil additives such as extreme pressure agents, anti-rust agents and dispersants.

An object of this invention is to provide novel phenolic antioxidant compositions having an extremely high degree of antioxidant activity in organic media. Another object is to provide for the preparation of highly soluble compositions exhibiting superlative antioxidant effectiveness. Still another object is to provide a novel mixture of symmetrical and asymmetrical methylenebis phenols which possess all of the outstanding properties discussed above. A still further object is to very effectively stabilize lubricating oil and other organic material normally susceptible to oxidative deterioration by incorporating therein a small amount of an outstandingly potent antioxidant mixture composed of symmetrical and asymmetrical methylenebis phenols. Another important object is to provide a variety of beneficial and compatible mixtures of the aforesaid methylenebis phenols and various extreme pressure agents, anti-rust agents and dispersants. Still another object of this invention is to provide a package of additives incorporating the mixture of methylenebis phenols described above as well as compatible, coacting extreme pressure agents, anti-rust agents and dispersants, suitable for direct incorporation into an otherwise unstabilized oil, so as to result in a commercially acceptable lubricating oil. A still further object is to provide lubricant compositions containing only relatively minor amounts of metallic additives, more preferably compositions which are free from metallic additives. Other important objects of this invention will be apparent from the ensuing description.

The above and other objects of this invention are accomplished by providnig a phenolic antioxidant composition comprising major amounts of a mixture of methylenebis phenols, said mixture comprising (1) at least one symmetrical methylenebis phenol having identically substituted phenol radicals and having the formula:

I 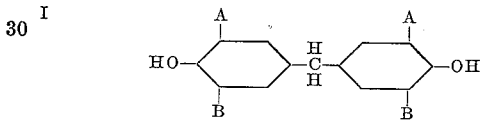

wherein A is a tertiary alkyl alkyl group having from 4 to about 9 carbon atoms and B is selected from the group consisting of hydrogen and alkyl groups having up to 9 carbon atoms and (2) at least one asymmetrical methylenebis phenol having different phenol radicals and having at least one ortho tertiary alkyl group of from 4 to 9 carbon atoms.

In the above composition the asymmetric methylenebis phenols are selected from compounds having the formulas:

II 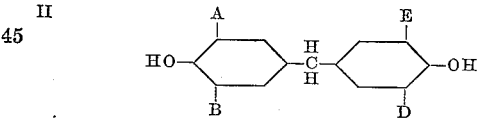

III 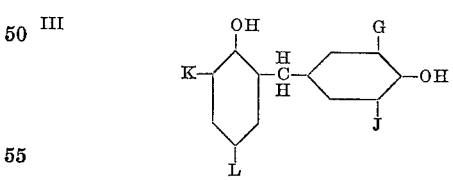

IV 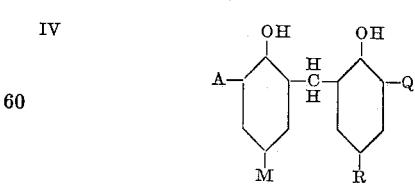

wherein D, E, G, J, K, L, M, Q and R are selected from the group consisting of hydrogen and alkyl groups having up to about 9 carbon atoms, such that the combination D, E is different from the combination A, B and at least one of G, J and K is a tertiary alkyl group having from 4 to 9 carbon atoms.

Representative compounds of this invention which correspond to Formula I above include 4,4'-methylenebis(2,6-di-tert-butylphenol);
4,4'-methylenebis(2-methyl-6-tert-butylphenol);
4,4'-methylenebis(2-tert-butylphenol);
4,4'-methylenebis(2-tert-butyl-6-isopropylphenol);
4,4'-methylenebis(2-ethyl-6-tert-octylphenol);
4,4'-methylenebis(2,6-di-tert-amylphenol);
4,4'-methylenebis(2-n-butyl-6-tert-hexylphenol);
4,4'-methylenebis(2-n-amyl-6-tert-nonyl);
4,4'-methylenebis(2,6-di-tert-heptylphenol); and
4,4'-methylenebis(2-tert-nonylphenol).

Representative compounds of this invention which correspond to Formula II above include (3-methyl-5-tert-butyl-4-hydroxyphenyl)-(4-hydroxyphenyl)-methane,
(3,5-di-tert-butyl-4-hydroxyphenyl)-(4-hydroxyphenyl)-methane,
(3,5-di-tert-butyl-4-hydroxyphenyl)-(3,5-demthyl-4-hydroxyphenyl)-methane,
(3-methyl-5-tert-butyl-4-hydroxyphenyl)-(3-methyl-4-hydroxyphenyl)-methane,
(3,5-di-tert-butyl-4-hydroxyphenyl)-(3-methyl-4-hydroxyphenyl)-methane,
(3,5-di-tert-butyl-4-hydroxyphenyl)-(3-tert-butyl-4-hydroxyphenyl)-methane,
(3,5-di-tert-butyl-4-hydroxyphenyl)-(3-methyl-5-tert-butyl-4-hydroxyphenyl)-methane,
(3-methyl-5-tert-amyl-4-hydroxyphenyl)-(3-methyl-5-tert-butyl-4-hydroxyphenyl)-methane and
[3-(1,1,3,3-tetramethylbutyl)-5-methyl-4-hydroxyphenyl]-(3-methyl-5-tert-butyl-4-hydroxyphenyl)-methane.

Illustrative of compounds having the structure shown in Formula III above include:

(3-tert-butyl-2-hydroxyphenyl)-(3,5-di-tert-butyl-4-hydroxyphenyl)-methane,
(3-tert-butyl-2-hydroxyphenyl)-(3-methyl-5-tert-butyl-4-hydroxyphenyl)-methane,
(2-hydroxyphenyl)-(3,5-di-tert-butyl-4-hydroxyphenyl)-methane,
(2-hydroxyphenyl)-(3-methyl-5-tert-butyl-4-hydroxyphenyl)-methane,
(3-methyl-2-hydroxyphenyl)-(3,5-di-tert-butyl-4-hydroxyphenyl)-methane,
(3-methyl-2-hydroxyphenyl)-(3-methyl-5-tert-butyl-4-hydroxyphenyl)-methane,
(3-methyl-5-tert-butyl-2-hydroxyphenyl)-(3,5-di-tert-butyl-4-hydroxyphenyl)-methane and
(3-methyl-5-tert-butyl-2-hydroxyphenyl)-(3-methyl-5-tert-butyl-4-hydroxyphenyl)-methane.

Examples of compounds having the structure corresponding to Formula IV above include:

[3-(1,1,3,3-tetra-methylbutyl)-2-hydroxyphenyl]-(3-tert-butyl-5-methyl-2-hydroxyphenyl)-methane,
(3-tert-butyl-5-isopropyl-2-hydroxyphenyl)-(3,5-di-methyl-2-hydroxyphenyl)-methane,
(3,5-di-tert-butyl-2-hydroxyphenyl)-(3-tert-butyl-5-methyl-2-hydroxyphenyl)-methane,
(3,5-di-tert-butyl-2-hydroxyphenyl)-(3,5-dimethyl-2-hydroxyphenyl)-methane,
(3-tert-butyl-2-hydroxyphenyl)-(2-hydroxyphenyl)-methane,
(3-tert-butyl-2-hydroxyphenyl)-(3,5-dimethyl-2-hydroxyphenyl)-methane,
(3-tert-amyl-5-methyl-2-hydroxyphenyl)-(3-methyl-5-tert-butyl-2-hydroxyphenyl)-methane and
[3-(1,1-dimethylbutyl)-5-methyl-2-hydroxyphenyl]-(3-isopropyl-2-hydroxyphenyl)-methane.

In a preferred embodiment of this invention the tertiary alkyl groups in the above-described compositions and compounds are tertiary butyl groups. This embodiment is preferred because it has been found that such configurations result in a high degree of antioxidant protection per weight of material. Compounds bearing such tertiary butyl configurations are also easy to prepare and more economical than compounds bearing tertiary alkyl groups having a higher number of carbon atoms. Illustrative examples of the compounds comprising this preferred embodiment of the invention can be noted by substituting tertiary butyl for the higher tertiary alkyl groups disclosed in the compounds cited above.

In another preferred embodiment of this invention each of the asymmetrical methylenebis phenols has at least one ortho tertiary butyl group on each phenol ring. This embodiment is preferred because asymmetric methylenebis phenols having such configurations have been found to have outstanding antioxidant properties and mixtures of symmetrical and asymmetrical methylenebis phenols having such configurations provide not only superior antioxidant properties but have an outstanding degree of solubility in lubricating oil and further provide beneficial reductions to combustion chamber deposits and exhaust emissions when used in a gasoline.

In a most preferred embodiment of this invention the only alkyl groups present are tertiary butyl groups. Such compositions are preferred because they have the best all-around antioxidant potency, especially in lubricating oil they are, for the most part, water and caustic insoluble, very economically prepared and are possessed to a high degree with all the beneficial properties described above. Referring to Formulas I–IV above, compounds falling within this embodiment are those in which A, B, E, G, K and Q are tertiary butyl groups, L, M and R are hydrogen and D and J are selected from the group consisting of hydrogen and tertiary butyl groups. More particularly the preferred symmetrical compounds are 4,4'-methylenebis(2,6 - di-tert-butylphenol), 4,4'-methylenebis(2-tert-butylphenol) and 2,2'-methylenebis(6-tert-butylphenyl). Asymmetric methylenebis phenols falling within this preferred embodiment are (3,5-di-tert-butyl-4-hydroxyphenyl)-(3-tert-butyl-4-hydroxyphenyl)-methane, (3,5-di-tert-butyl - 4-hydroxyphenyl)-(3-tert-butyl-2-hydroxyphenyl)-methane and (3 - tert-butyl-4-hydroxyphenyl)-(3-tert-butyl-2-hydroxyphenyl)-methane.

In the above embodiment the concentration of 4,4'-methylenebis(2,6-di-tert-butylphenol) plays an important part in the properties of the mixture. Those compositions in which there is a maximum of 80 weight percent 4,4'-methylenebis(2,6-di-tert-butylphenol) are preferred in that such compositions possess more deirable antioxidant and solubility properties. Even more preferred are those compositions in which the maximum concentration of 4,4'-methylenebis(2,6-di-tert-butylphenol) is 68 weight percent. These latter compositions comprise a most preferred embodiment of this invention in that they possess the most desirable antioxidant and solubility characteristics. They show a very high degree of stabilization in storage and handling and have a mobility and fluidity that is most convenient and economical when incorporating the antioxidant composition into lubricating oil. Further, the materials of this embodiment display excellent compatibility with other additives to be described, such as extreme pressure agents, anti-rust agents, dispersants and viscosity index improvers, and can be incorporated along with these other agents and additives into an oil to form a concentrate which can be incorporated directly as a "package" into unstabilized lubricating oil to form a commercially acceptable lubricating oil.

The compound and mixtures of this invention can be prepared by reacting (1) a mixture of mononuclear phenolic compounds containing at least two phenols having a hydrogen atom available in an ortho or a para position, one of said phenols containing a tertiary alkyl group ortho to the hydroxyl group with (2) formaldehyde, under basic conditions.

Thus, when it is desired to prepare a compound of Formula II (and simultaneously a compound of Formula I), a mixture of a 2,6-dialkylphenol in which one of the alkyl groups is a tertiary alkyl group and an alkyl phenol having a hydrogen in the 4 position, such as 2,6-xylenol, is used. A compound of Formula III can be prepared, for example, by the reaction between 2,6-di-tert-butyl-phenol and 2,4-di-tert-butylphenol with formaldehyde in the presence of a lower aliphatic alcohol having up to 4 carbon atoms under basic conditions. To prepare a compound of Formula IV, a mixture containing two different phenols having an unsubstituted ortho position is employed. For example, a mixture containing 2,4-di-tert-butylphenol and 2,4-xylenol may be employed.

The make-up of the mixtures of phenols employed in the process of this invention can vary over a wide range. Thus, as high as 93–94 mole percent of first phenol and 6 to 7 percent of a second phenol may be employed. Generally speaking, however, at least 10 percent of a single phenolic compound having a hydrogen in the ortho or para position or both and a tertiary alkyl group of from 4–9 carbon atoms ortho the hydroxyl group is employed. Thus, mixtures of from 10–50 percent of a first phenol and 50–90 percent of a second phenol are employed.

In a preferred embodiment of this invention the major phenol, i.e., at least 50 percent, is a 2,6-di-tert-alkylphenol and most preferably 2,6-di-tert-butylphenol. In this further preferred embodiment there is present in the reaction mixture from 10 to 50 percent of a 2-tert-alkylphenol, preferably 2-tert-butylphenol.

In an especially advantageous embodiment of this invention the mixture of phenols employed is that obtained from a commercial "ortho" alkylation reaction; that is, the process described and claimed in U.S. Patent No. 2,831,898. In this reaction a mixture of 2-tert-butyl-phenol; 2,4,6-tri-tert-butylphenol and 2,6-di-tert-butyl phenol is obtained by "ortho" alkylating phenol with isobutylene using an aluminum phenoxide catalyst. In this embodiment of the invention the mixture is contemplated as having from 50 to 90 percent 2,6-di-tert-butylphenol, from 5 to 30 percent 2-tert-butylphenol and from 3 to 15 percent 2,4,6-tri-tert-butylphenol.

In a particularly preferred embodiment of this invention the mixture of phenols containing 62 to 68 percent 2,6-di-tert-butylphenol, 19 to 25 percent 2-tert-butylphenol and 5 to 9 percent 2,4,6-tri tert-butylphenol. It has been found that reacting this mixture with formaldehyde under basic conditions produces a most efficacious and surprisingly effective antioxidant composition, which has all the beneficial attributes described above.

A solvent for the phenolic reactant can, but need not, be used depending on the fluidity of the starting material and on the desired properties of the product. For example, when the "ortho-alkylation" mixture of phenols described above is used, a solvent can be avoided by simply increasing the relative ratio of phenolic mixture to formaldehyde; for example, doubling the concentration of phenolic mixture present. The resultant product is very soluble in organic media and highly effective and highly fluid as well as being of a very low cost. When no solvent for the phenolic reactants is used, a small amount of solvent for the formaldehyde should be used. Thus, for example, enough methanol should be added to prevent the formaldehyde from oxidizing to formic acid which would hamper the reaction by reacting with the basic catalyst.

On the other hand, a solvent may be employed advantageously not only with those phenolic mixtures that are not fluid but also with those that are, such as the aforementioned "ortho-alkylation" mixture of phenols. Thus, a lower aliphatic alcohol having from 1 to about 4 carbon atoms may be employed in the process of this invention. Those aliphatic alcohols having from 2–4 carbon atoms, i.e., ethanol, propanol, isobutanol and the butanols are preferred since highly effective and readily soluble products are prepared by employing these. Methanol may also be employed in the process of this invention but the yield of asymmetric methylenebis phenols is somewhat reduced due to the formation of a higher percentage of methylols. Surprisingly, however, the use of methanol actually gives more desirable properties, such as better mobility and fluidity, when used alone or in conjunction with the other alcohols mentioned.

Thus another preferred embodiment of this invention comprises reacting a mixture of phenols as hereinbefore described with formaldehyde in the presence of one or more lower aliphatic alcohols under basic conditions.

In a particularly preferred embodiment of this invention a small amount of methanol is also used as a solvent in addition to a larger amount of another aliphatic alcohol.

The above solvent preferences are most advantageously employed when using an "ortho-alkylation" mixture of tert-butylphenols as described above; that is, one in which the phenolic mixture contains from 50 to 90 percent 2,6-di-tert-butylphenol and from 3 to 30 percent each of 2-tert-butylphenol and 2,4,6-tri-tert-butylphenol. When such a mixture is used there will be at least 2.8 weight percent of 2,4,6-tri-tert-butylphenol in the product. [The contribution to the product weight by the formaldehyde reactant will be greatest when the 2-tert-butylphenol, containing two reactive sites, is present in the reactant mixture in maximum amounts. Accordingly, when a mixture containing 3 weight percent of 2,4,6-tri-tert-butyl-phenol, 30 weight percent of 2-tert-butylphenol, and 67 weight percent of 2,6-di-tert-butylphenol is reacted as above with formaldehyde the resulting product will contain the least amount of 2,4,6-tri-tert-butylphenol. This least amount can be calculated by assuming complete reaction. Thus, with 100 grams of reactant, there will be 0.200 mole of 2-tert-butylphenol and 0.325 mole of 2,6-di-tert-butylphenol, resulting in the use of 0.725 mole of formaldehyde ($2 \times 0.200 + 0.325 = 0.725$ mole of reactive sites). Since each mole of formaldehyde contributes 12.0 grams to the product weight, the formaldehyde contribution is 8.70 grams ($12.0 \times 0.725$). Accordingly, the amount of 2,4,6-tri-tert-butylphenol in a product prepared from 100 grams of the reactants described above is $3 \times 100/100 + 8.70 = 2.8$ percent.]

In a most particularly preferred embodiment of this invention a phenolic mixture containing 62 to 68 percent 2,6-di-tert-butylphenol, 19 to 25 percent 2-tert-butylphenol and 5 to 9 percent 2,4,6-tri-tert-butylphenol is reacted with formaldehyde in the presence of a solvent containing minor amounts of methanol and major amounts of an aliphatic alcohol having from 1 to about 4 carbon atoms, under basic conditions.

The formaldehyde may be employed as the pure compound or as paraformaldehyde. Formalin (aqueous formaldehyde) may also be employed but since its use introduces excess water to the reaction, other forms of formaldehyde are preferred.

The basic conditions under which the process is conducted are obtained with a strong base, preferably sodium or potassium hydroxide. In laboratory preparations, potassium hydroxide is preferred because it is less hygroscopic and has greater solubility in alcohol. However, sodium hydroxide may preferably be employed in commercial operations.

In general, the reaction is conducted at or near the reflux temperature of the mixture for from about 30 minutes to 6 hours. However, reaction temperatures both substantially below and above the reflux temperature may be employed and reaction times outside this range will also yield desirable products. A reaction time of about 2 hours is usually sufficient to assure suitable conversion.

When the reaction is completed the mixture should be neutralized with an acid, such as glacial acetic acid, the water phase separated and the majority of the excess alcohol stripped from the mixture. Further workup of the mixture is often desirable and this may be accomplished by diluting with a solvent, such as toluene or benzene, and washing the mixture with water several times, after which the product is dried and the solvent removed by stripping or distillation. Solvent dilution should be carried out prior to cooling to facilitate handling. After removal of the solvent, and while hot, the product may be filtered through a cartridge filter with nitrogen pressure, the cartridge filter being preheated to prevent plugging.

In another separate and distinct embodiment of this invention there is provided compounds and mixtures of compounds similar to those of the various preferred embodiments discussed above but in which ortho hydrogen atoms are replaced by methyl groups. Thus, the asymmetric compound, (3,5-di-tert-alkyl-4-hydroxyphenyl)-(3-tert-alkyl-4-hydroxy-5-methylphenyl)methane is provided, the alkyl group having from 4 to 9 carbon atoms. Also provided are mixtures of this asymmetric compound and the symmetrical compounds 4,4'-methylenebis(2,6-di-tert-alkylphenol) and 4,4'-methylenebis(2-tert-alkyl-6-methylphenol). The asymmetrical compound of this embodiment possesses solubility and antioxidant properties not possessed by otherwise similar but symmetrical compounds. Further, the mixtures of this embodiment possess outstanding antioxidant effectiveness and superior solubility in lubricating oil as well as a high degree of water and caustic insolubility. They are more expensive to prepare than other embodiments previously described but in certain applications they are cheaper on a cost effectiveness basis.

Within this latter embodiment a preferred narrower embodiment is that in which the tertiary alkyl group is a tertiary butyl group. Thus, the asymmetrical compound most preferred in this embodiment is (3,5-di-tert-butyl-4-hydroxyphenyl)-(3 - tert - butyl - 4 - hydroxy - 5 - methylphenyl)methane, alone or in conjunction with mixtures of the symmetrical compounds 4,4'-methylenebis(2,6-di-tert-butylphenol) and 4,4'-methylenebis(2 - tert-butyl-6-methylphenol).

The compounds of this last embodiment can be prepared using the general method described above and using from 15 to 85 mole percent of 2,6-di-tert-alkylphenol and from 85 to 15 mole percent of 2-methyl-6-tert-alkylphenol. Thus, to prepare the tertiary butylated compounds just discussed, a mixture of from 15 to 85 mole percent of 2,6-di-tert-butylphenol and from 85 to 15 mole percent of 2-methyl-6-tert-butylphenol is reacted with formaldehyde in the presence of a lower aliphatic alcohol under basic conditions to yield a mixture of the compounds.

The following examples, in which all parts are by weight, illustrate the preparative process of this invention and the products obtained.

EXAMPLE I

In a reaction vessel equipped with reflux condenser, heating means, means for agitating the contents and means for keeping a reaction mass under nitrogen flush was added a solution of 460 parts of 2-methyl-6-tert-butylphenol and 103 parts of 2,6-di-tert-butylphenol in 1184 parts of absolute ethanol. The reaction mixture was stirred and then flushed with nitrogen. About 500 parts of 36 percent formalin followed by 264 parts of sodium hydroxide in 500 parts of water were added to the reaction mixture. The sodium hydroxide was added dropwise after the formalin had been added to the reaction vessel and the contents brought to reflux temperature. After the addition of all reactants, reflux was maintained for two hours under a continued nitrogen blanket. The reaction mixture was then cooled and neutralized with 50 percent acetic acid and poured into 10,000 parts of water to remove the alcohol. The aqueous and organic layers were separated and the aqueous layer was extracted with n-hexane. The organic portions were then combined, washed twice with water and dried. The hexane solvent was stripped at two millimeters of mercury pressure at 100° C. giving about 10 parts of distillate and leaving about 610 parts of a very viscous amber oil. Infrared analysis of this oil showed it to contain primarily a mixture of 4,4'-methylenebis(2,6-di-tert-butylphenol), 4,4'-methylenebis(2 - methyl-6-tert-butylphenol), (3,5-di-tert-butyl-4-hydroxyphenyl)-(3 - methyl - 5 - tert - butyl-4-hydroxyphenyl)-methane with 3,5-di-tert-butyl-4-hydroxybenzyl ethyl ether, 3,5-di-tert-butyl-4-hydroxybenzyl alcohol, 3-methyl-5-tert-butyl-4-hydroxybenzyl ethyl ether and 3-methyl-5-tert-butyl-4-hydroxybenzyl alcohol as minor components.

Portions of this viscous liquid were dissolved at 5, 10 and 20 weight percent concentrations to a neutral hydrocarbon lubricating oil by heating to 100° C. After standing for three weeks at room temperature, none of these oil solutions showed any precipitate.

In the above example the ratio of starting materials was 85 mole percent of 2-methyl-6-tert-butylphenol to 15 mole percent of 2,6-di-tert-butylphenol and it can be seen that a highly soluble product was formed by this mixture. In addition to its highly desirable solubility properties this mixture has an outstanding antioxidant effectiveness. This is shown, for example, by the following test: Some of the mixture was dissolved in pure white refined mineral oil to the extent that 0.496 weight percent was present in the mineral oil. Ferric hexoate was also added to the mineral oil to catalyze oxidation and make the test more severe. The concentration of the iron salt was adjusted to 0.05 percent based on $Fe_2O_3$. One ml. of the resulting composition was charged to an apparatus for measuring the oxidative stability of the mineral oil. The apparatus consists of a glass vessel having a 12 ml. capacity and an inlet tube which can be connected to a mercury manometer. The vessel is flushed with oxygen at atmospheric pressure and then connected to the mercury manometer. It is then immersed in a constant temperature bath at 150° C. whereupon the oxoygen pressure rise is indicated on the manometer. The manometer is observed until a rapid pressure drop in the vessel occurs. The time from immersion to initiation of the pressure drop is the induction period of the mineral oil. When mineral oil containing the iron hexoate is subjected to this oxidative test, a pressure drop in the manometer is observed in from 2 to 3 minutes, showing that the mineral oil is unstable to oxidative deterioration at 150° C. However, when the composition containing 0.496 weight percent of the mixture prepared as shown in Example I is tested in this fashion, no pressure drop is observed in the manometer until after 172 minutes. When pure 4,4'-methylenebis(2,6-di-tert-butylphenol), an outstanding symmetrical antioxidant, is tested by this procedure, the induction time is 84 minutes.

EXAMPLE II

To the apparatus described in Example I was charged a mixture of 187 parts of potassium hydroxide, 76 parts of paraformaldehyde, 783 parts of an equimolar mixture of 2,6-di-tert-butylphenol and 2-methyl-6-tert-butylphenol and 600 parts of 95 percent ethanol. The mixture was refluxed for two hours, then cooled and neutralized with glacial acetic acid. The majority of the excess alcohol was removed by distillation and the reaction mixture was then diluted with 1070 parts of ether. The reaction mixture was then washed three times with water, dried and the solvent was removed by distillation. The resulting liquid mixture of 4,4'-methylenebis(2,6-di-tert-butylphenol), 4,4'-methylenebis(2-methyl-6 - tert-butylphenol), (3,5-di-tert-buty l-4 - hydroxyphenyl) - (3-methyl-5-tert-butyl-4-hydroxyphenyl)-methane and other minor components had extremely good solubility properties when tested as described in Example I at concentrations of 5, 10 and 20 percent in a neutral mineral lubricating oil. Furthermore, when tested in pure white mineral oil under the same conditions as described above the mixture prepared in Example I, a concentration of 0.496 weight percent of this mixture had an induction time of 182 minutes, which indicates that it is an extremely effective antioxidant.

A portion of the reaction mixture, after drying and before solvent removal, is subjected to fractional crystallization. Upon careful cooling of the mixture a first batch of crystals is obtained which is subsequently recrystallized from hexane to yield a crop of light yellow crystals melting at 120–122° C. Further recrystallization from hexane gives a purified compound having a melting point of 122–122.8° C. This pure compound is pure (3,5-di-tert-butyl-4-hydroxyphenyl)-(3-methyl-5-tert-butyl-4-hydroxyphenyl)-methane. The analysis is 81.9 percent carbon and 10.1 percent hydrogen. The calculated content for the compound having the molecular formula $C_{26}H_{38}O_2$ is 81.7 percent carbon and 10.02 percent hydrogen. The structure of the compound is affirmed by infrared analysis. The narrow melting point range of 122–122.8° C. also testifies to the purity of the compound and lack of adduct formation with the symmetrical compounds.

EXAMPLE III

A mixture of 75 percent of 2,6-di-tert-butylphenol and 15 percent ortho-tertiary butyl phenol containing 10 percent of 2,4,6-tri-tert-butylphenol was reacted with paraformaldehyde in the presence of ethanol. The following amounts of reactants were employed:

724 parts of phenol mixture
20 parts of potassium hydroxide
76 parts of paraformaldehyde
600 parts of 95 percent ethanol The reaction was conducted at reflux (81–83° C.) for two hours after which time the mixture was cooled to 70° C. and neutralized with glacial acetic acid. The alcohol was stripped under vacuum beginning at 70° C. and ending at 35° C. and 10 mm. pressure. The residue was then dried with 1400 parts of benzene and washed three times in 750 part aliquots of water, dried and the benzene was removed by vacuum distillation. The reaction product, a viscous oil, was found to be completely soluble and miscible with a hydrocarbon lubricating oil at up to 20 percent weight concentration. The reaction product contains 4,4'-methylenebis(2,6 - di-tert-butylphenol), (3,5-di-tert-butyl-4-hydroxyphenyl)-(3-tert-butyl-2-hydroxyphenyl)-methane and (3,5-di-tert-butyl-4-hydroxyphenyl)-(3-tert-butyl-4-hydroxyphenyl)-methane as major components. In addition the reaction mixture contains numerous other possible condensation products of 2,6-di-tert-butylphenol and o-tert-butylphenol such as 4,4'-methylenebis(2-tert-butylphenol), 2,2'-methylenebis(6-tert-butylphenol), (3-tert-butyl-2-hydroxyphenyl)-(3-tert-butyl-4-hydroxyphenyl)-methane, 3-tert-butyl-4-hydroxybenzyl ethyl ether, 3-tert-butyl - 2 - hydroxybenzyl ethyl ether, the derivative of o-tert-butylphenol having ethyl ether substituents on methyl groups ortho and para to the hydroxyl group, and various molecular weight polymers of the substituents present having open reactive ortho or para positions.

EXAMPLE IV

Potassium hydroxide, 20 parts, paraformaldehyde, 75 parts, and 568 parts of a mixture of 15 mole percent of 2,6-di-tert-butylphenol and 85 mole percent of 2-methyl-6-tert-butylphenol were dissolved in 800 parts of isopropanol. The mixture was heated at reflux for three hours, cooled and then neutralized with glacial acetic acid and quenched in 10,000 parts of water. After phase separation the reaction mixture was diluted with ether to three times volume. After dilution, the mixture was washed three times with water, dried and the solvent was removed. The product was a crystalline solid which is soluble in a neutral mid-continental commercially available lubricating oil.

EXAMPLE V

In 1250 parts of 95 percent ethanol was dissolved 663 parts of a mixture of 85 mole percent of 2,6-di-tert butylphenol and 15 mole percent of 2-methyl-6-tert-butylphenol. To the solution was added 500 parts of a 0.65 mole aqueous formaldehyde solution. The mixture was then heated to reflux and 264 parts sodium hydroxide in 500 parts of water was added slowly to the reaction mixture. After addition of the base reflux was continued for two hours; the mixture was then cooled and neutralized with acetic acid. The mixture was diluted with about 900 parts of benzene. The aqueous phase was quenched in water and extracted with benzene twice and the combined organic product was washed three times with water, dried and separated from the solvent by distillation. The product was a solid and was recovered in about theoretical yield.

EXAMPLE VI

Potassium hydroxide, 20 parts, paraformaldehyde, 76 parts and 665 parts of a mixture of 85 mole percent of 2,6-di-tert-butylphenol and 15 mole percent of 2-methyl-6-tert-butylphenol were dissolved in 600 parts of 95 percent ethanol. The mixture was heated at reflux for two hours, cooled and neutralized with glacial acetic acid. The majority of the alcohol was then stripped by distillation and the reaction mixture was diluted with 1200 parts of ether as a solvent. The product was washed three times with 750 part aliquots of water, dried and separated from the solvent by vacuum distillation leaving 705 parts of product.

EXAMPLE VII

The procedure of Example V was repeated using as the phenol a mixture of 75 percent of 2,6-di-tert-butylphenol and 15 percent o-tert-butylphenol containing 10 percent of 2,4,6-tri-tert-butylphenol.

EXAMPLE VIII

The procedure of Example II is followed using as the phenolic mixture 85 mole percent of 2,6-di-tert-butylphenol and 15 mole percent of 6-(1,1,3,3-tetra-methylbutyl)-o-cresol to obtain a composition containing about 25 percent of (3,5-di-tert-butyl - 4 - hydroxyphenyl) - [3-methyl-5-(1,1,3,3-tetramethylbutyl) - 4 - hydroxyphenyl]-methane.

EXAMPLE IX

The procedure of Example V is repeated using as the phenolic mixture a mixture containing 85 mole percent of 2,6-di-tert-butylphenol and 15 mole percent of 6-($\alpha,\alpha$-dimethylbenzyl)-o-cresol. The product, which is an excellent antioxidant, contains about 25 percent of (3,5-di-tert-butyl-4-hydroxyphenyl)-[3-methyl - 5 - ($\alpha,\alpha$-dimethylbenzyl)-4-hydroxyphenyl]-methane.

EXAMPLE X

Following the procedure set forth in Example V, a mixture of 85 mole percent of 2,6-di-tert-butylphenol and 15 mole percent of 2-(1,1,3,3-tetramethylbutyl)-o-cresol was reacted with formaldehyde in the presence of 95 percent ethanol and aqueous formaldehyde. The reaction yielded a mixture of compounds containing approximately the same distribution of products as formed in Example VIII.

EXAMPLE XI

Following the procedure of Example VI a mixture of 50 mole percent of o-tert-butylphenol and 50 mole percent of o-cresol is reacted with formaldehyde. In this example, isobutanol is employed as the solvent. The reaction product contains a large proportion of (3-tert-butyl - 2 - hydroxyphenyl) - (3 - methyl - 2 - hydroxyphenyl)-methane and is a potent antioxidant.

EXAMPLE XII

A mixture of equimolar parts of 6-tert-amyl-p-cresol and 2-methyl-6-tert-butylphenol (1,000 parts) is added to 1,000 parts of an equal volume mixture of methanol and isopropanol. 750 parts of 36 percent formalin followed by 500 parts of sodium hydroxide in 1,000 parts of water was added to the reaction mixture. The base is added slowly after the formalin addition and the mixture is brought to reflux. After addition of all the reactants reflux is maintained for six hours. Workup of the product is performed as described in Example I. The product contains substantial quantities of (3-tert-amyl-5-methyl - 2 - hydroxyphenyl) - (3 - methyl - 5 - tert-butyl-4-hydroxyphenyl)-methane and also contains some 4-methoxy-methyl-2-methyl-6-tert-butylphenol and 2-methoxy-methyl-4-methyl-6-tert-amylphenol.

EXAMPLE XIII

The general procedure of Example III was repeated through the reaction stage. After completion of the reaction, the alcohol was distilled off at atmospheric pressure and the residue was diluted with an equal volume of a neutral additive-free mixed base lubricating oil and heated to 85° C. In this procedure, after the reaction product is completely dissolved in the lubricating oil, the product is washed with water three times and dried. In this manner a final product already dissolved in oil is obtained and a subsequent removal of solvent is rendered unnecessary.

EXAMPLE XIV

A reaction vessel equipped with a reflux condenser, heating means, means for agitating the contents and means for keeping a reaction mass under nitrogen flush was flushed with nitrogen and charged with 1500 parts of isopropanol and 22.8 parts of methanol with stirring. Fifty-eight and eight tenths parts of 85 weight percent potassium hydroxide pellets were charged to the vessel. The vessel was heated to 44° C. to dissolve the potassium hydroxide pellets. To this was added 1750 parts of a mixture comprising 78.0 percent 2,6-di-tert-butylphenol, 9.9 percent 2-tert-butylphenol and 8.1 percent 2,4,6-tri-tert-butylphenol. One hundred seventy-five parts of 95 percent paraformaldehyde was charged to the vessel and the vessel sealed. The vessel contents were heated to reflux and held there for two hours. The vessel contents were then cooled to 24° C. and neutralized with 46.5 parts of glacial acetic acid resulting in a color change from purple to a yellow-orange. The vessel contents were then heated to a temperature of 85° C. at 100 mm. mercury vacuum pressure to distill off the alcohol. The reaction mass was cooled to about 90° C. and 3810 parts of toluene were added. The product was water washed with four 700-part washes to a pH of 6. The mass was then heated to 100° C. at 10 mm. mercury vacuum pressure to distill off the toluene. While still hot the dark amber product was filtered through a cartridge filter to yield the final product.

EXAMPLE XV

The procedure of Example XIV is repeated using as the phenol a mixture of 62 percent 2,6-di-tert-butylphenol, 25 percent 2-tert-butylphenol and 9 percent 2,4,6-tri-tert-butylphenol. Analysis of the product shows maximums of 1.0 weight percent 2,6-di-tert-butylphenol, 1.5 weight percent 2-tert-butylphenol and 9.0 weight percent 2,4,6-tri-tert-butylphenol.

EXAMPLE XVI

The procedure of Example XIV is repeated using as the phenol a mixture of 68 percent 2,6-di-tert-butylphenol, 19 percent 2-tert-butylphenol and 5 percent 2,4,6-tri-tert-butylphenol.

EXAMPLE XVII

The procedure of Example XIV was followed except that the ispropyl alcohol solvent was eliminated and the amount of phenol mixture used was approximately doubled and contained 75 percent 2,6-di-tert-butylphenol, 9 percent 2-tert-butylphenol and 14 percent 2,4,6-tri-tert-butylphenol. There were 3500 parts of the mixture of phenol, 146 parts of 95 percent formaldehyde, 59 parts of 85 weight percent potassium hydroxide pellets and 23 parts of methanol. The final product weighed 3550 parts and was quite fluid at room temperature.

EXAMPLE XVIII

The procedure of Example XIV was followed except that the isopropanol was replaced entirely by methanol and the phenol mixture used contained 73 percent 2,6-di-tert-butylphenol, 12 percent 2-tert-butylphenol and 11 percent 2,4,6-tri-tert-butylphenol. There were 1750 parts of the phenolic mixture, 1500 parts of methanol, 59 parts of 85 weight percent potassium hydroxide pellets and 157 parts of 95 percent paraformaldehyde. There were 1850 parts of final product which was quite mobile at room temperature.

EXAMPLE XIX

The procedure of Example XVIII was followed except that the relative ratios of phenol, paraformaldehyde and potassum hydroxide were approximately doubled and the amount of methanol reduced by approximately two-thirds. Thus, there were 3500 parts of the same phenolic mixture, 560 parts of methanol, 314 parts of 95 percent paraformaldehyde and 110 parts of 85 weight percent potassium hydroxide pellets. Thirty-nine hundred parts of a hazy product were obtained which were filtered through Celete. The final product was very mobile and quite pourable at room temperature.

EXAMPLE XX

The procedure of Example XIV was followed except that the phenol mixture comprised 62 percent 2,6-di-tert-butylphenol, 22 percent 2-tert-butylphenol and 10 percent 2,4,6-tri-tert-butylphenol. The process yielded 1805 parts of final product which, by analysis, showed 1.3 percent 2-tert-butylphenol, 0.3 percent 2,6-di-tert-butylphenol, 0.5 percent 2,4-di-tert-butylphenol, 0.4 percent 2-(1,1,3,3-tetra-methyl-n-butyl)phenol and 1.8 percent toluene.

EXAMPLE XXI

The procedure of Example XIV was followed, using as the phenol mixture the reaction product of an ortho-alkylation reaction in which phenol was reacted with isobutylene in the presence of an aluminum phenoxide catalyst, as described and claimed in U.S. Patent No. 2,831,898. The resulting product has all of the beneficial attributes described above.

A number of antioxidant compositions of this invention were tested as described above following Example I to show antioxidant effectiveness in pure white mineral oil. The tests employed were identical to that described following Example I in which a quantity of the antioxidant is added to the mineral oil which contains an oxidation catalyst. The oxygen induction time for each sample of the mineral oil containing the antioxidant was determined and the results were summarized in Table I.

Table I
ANTIOXIDANT EFFECTIVENESS IN WHITE MINERAL OIL

| Additive | Concentration, wt. percent | Induction Time in Minutes |
|---|---|---|
| 1. None | | 2-3 |
| 2. Product of Example I | 0.496 | 172 |
| 3. Product of Example II | 0.496 | 182 |
| 4. Product of Example IV | 0.496 | 195 |
| 5. Product of Example V | 0.496 | 125 |
| 6. Product of Example VI | 0.496 | 122 |
| 7. (3,5-di-tert-butyl-4-hydroxyphenyl)-(3-methyl-5-tert-butyl-4-hydroxyphenyl)-methane | *1.00×10⁻² | 209 |

*Molar/liter.

The data in Table I show that all of the compositions of this invention impart excellent antioxidant characteristics to the mineral oil. However, it can be seen that those compositions which are prepared from compositions containing a substantial quantity of 2-methyl-6-tert-butylphenol get outstanding results. However, the compositions containing substantial proportions of other products are also effective antioxidants and have the marked advantage of being more readily soluble than the pure asymmetric methylenebis phenols themselves.

Lubricating oils are greatly benefited by the practice of this invention. To illustrate the antioxidant effectiveness of compositions of this invention in lubricating oil recourse is had to the Polyviriform Oxidation Stability Test as described in the paper entitled "Factors Causing Lubricating Oil Deterioration in Engines," Ind. and Eng. Chem. Anal., Ed. 17, 302 (1945). See also "A Bearing Corrosion Test for Lubricating Oil and Its Correlation With Engine Performance" (Anal. Chem. 21, 737 (1949)). This test effectively evaluates the performance of lubricating oil antioxidants. The test equipment procedure employed and correlations of the results with engine performance are discussed in the first paper above cited. By employing various compositions of this invention in oxygen-sensitive lubricating oil, effective inhibition of oxidative deterioration is achieved.

Tests conducted using the method and apparatus essentially as described in the publication first above mentioned show the benefits obtained by the additives of this invention. One minor modification was that the steel sleeve and copper test piece described in this publication were omitted from the apparatus. In these tests a neutral mineral crankcase oil consisting of mixed base and no additive was used. The principal test conditions consisted of passing 70 liters of air per hour through the test oil for a total period of 20 hours while maintaining the oil at a temperature of 300° F. The 300° temperature was employed in these tests to show that the antioxidants of this invention are outstanding even at greatly elevated temperatures. It has been found in practice that many compounds which exhibit antioxidant properties at 280° F. fail the Polyveriform Test at 300°. The transition from 280 to 300° F. therefore represents a critical test of the usefulness of an antioxidant in lubricating oil. Oxidative deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of oil employed. Lubricating oils of this invention were then prepared by blending individual samples of the above oil with compositions prepared by the process of this invention. These compositions were then subjected to the above stringent oxidation test. The results of these tests are shown in Table II.

The data in Table II clearly indicate that excellent results are obtained by using the compositions of this invention. Thus, in each test a very great reduction in acid number and viscosity increase was achieved by the compositions of this invention. Furthermore, the visual sludge rate of the oils was in every case improved by the addition of 1 percent of a composition prepared by the process of this invention.

Table II
POLYVERIFORM TEST DATA

| Additive | Concentration in wt. percent | Acid No. | Percent Viscosity Increase (SUS at 100° F.) | Visual Sludge Rating |
|---|---|---|---|---|
| 1. None | | 6.0 | 103 | B |
| 2. (3,5-di-tert-butyl-4-hydroxyphenyl)-(3-methyl-5-tert-butyl-4-hydroxyphenyl)-methane | 1.0 | 3.7 | 64 | A |
| 3. Product of Example II | 1.0 | 5.2 | 62 | A |
| 4. Product of Example III | 1.0 | 5.0 | 64 | A |
| 5. Product of Example V | 1.0 | 4.8 | 58 | A |
| 6. Product of Example VI | 1.0 | 4.9 | 56 | A |
| 7. Product of Example VII | 1.0 | 4.7 | 73 | A |
| 8. Product of Example VIII | 1.0 | 5.0 | 62 | A |

In evaluating the improved lubricants of this invention, engine tests are used to demonstrate the reduced engine wear characteristics and greatly improved oxidation stability of the oil as well as greatly reduced bearing corrosion properties. A preferred series of tests is with the single cylinder CLR oil test engine using CRC test designation L-38 with certain minor modifications. The L-38 test is completely described in a pamphlet published by the Motor Oil Oxidation Test Group of the Motor Vehicle, Fuel, Lubricant and Equipment Research Committee of the Coordinating Research Council Inc. The tests were conducted on a straight mineral oil containing no additives which had an SAE viscosity of 20. In addition to a test on the mineral oil without additives, a test was conducted using one-half weight percent of the product of Example III.

The test technique involves the continuous operation of the single cylinder CLR oil test engine under constant speed, air-fuel ratio and fuel-flow conditions for a total of at least 40 hours, subsequent to a break-in period of 4½ hours. Prior to each test run, the engine is thoroughly cleaned, measurements of certain engine parts are taken and a new set of piston rings and new copper lead connecting rod test bearing inserts are installed. Performance of the test oil is judged by a visual examination of the engine for deposits, by the weight loss of the copper lead test bearing and by a comparison of the inspection data on samples of used oil taken at periodic intervals with the inspection data on the new oil. These inspection data consist of the viscosity at 100° F., the acid number and a visual rating of the oil.

For the following tests certain modifications were made in the L-38 test procedure as outlined in the publication described above. The oil sump was operated at 280° F. and a constant engine speed of 3075 r.p.m. was employed. A bronze camshaft thrust washer was employed instead of the aluminum washer called for. The fuel employed in the test was a mixture of 60 percent alkylate and 40 percent of a commercially available base stock with 3 ml. of tetraethyllead per gallon as 62 mix. The "off gas," that is, the total of blowby and year bled into the crankcase was not measured. The result of these tests show that the base oil is greatly improved by the addition thereto of ½ weight percent of a product of Example III. This is shown by the data in Table III summarizing the test results.

Table III
L-38 TEST RESULTS

| Additive | Concentration, wt. percent | Bearing Weight Loss (mg.) | Oil After 40 Test Hours | |
|---|---|---|---|---|
| | | | Acid No. | Viscosity Increase, Percent |
| None | | 1,828 | 3.1 | 10.9 |
| Product of Example III | 0.5 | 139 | 2.0 | 6.4 |

The results of these tests as shown in Table III indicate a much more highly stable oil and vastly reduced bearing weight loss resulting from employing a composition of this invention.

To illustrate the unusual and high degree of solubility of the products of this invention in lubricating oil, samples of a petroleum oil containing various concentrations of the product of Example XIV were stored at 0° F. for 25 days. The results are listed in Table IV.

*Table IV*

25 DAYS STORAGE AT 0° F.

| Concentration (wt. percent): | Appearance |
|---|---|
| 39.41 | Clear |
| 50.00 | Clear |

The above results demonstrate that even at 0° F. the compositions of this invention are soluble at 50 weight percent in lubricating oil. Such results cannot be obtained with prior art methylenebis phenols or mixtures of methylenebis phenols. For example, the commercial antioxidant 4,4' - methylenebis(2,6-di-tert-butylphenol) has a maximum effective solubility of about 5 percent. This is significant since the high solubility characteristics of the products of this invention allow them to be used in "packages" of concentrated oil additives whereas prior antioxidants cannot be so used.

Liquid hydrocarbon fuels employed in the operation of a spark ignition combustion engine are also vastly improved in their properties by the practice of this invention. Not only is their storage stability improved but other surprising beneficial properties are obtained when the fuel is used in the engine. These surprising effects include reduction of combustion chamber deposits by as much as 57 percent and reduction of exhaust emissions when a gasoline containing a product of this invention is used.

To illustrate the unusual and beneficial effects of the products of this invention on reducing combustion chamber deposits in an engine, combustion chamber deposit tests were run. A single cylinder Oldsmobile engine having a combustion ratio of 9.7 to 1 was run at 1370 r.p.m. with a 12.5 air to fuel ratio. The engine had a 10° B.T.C. ignition timing with the carburetor inlet air at 165° F. The mixture had a temperature of 140° F., with coolant and oil temperatures of 160° F. and 190° F., respectively. The engine was run for 45 hours using a Veedol Finished oil as lubricant and an Indolene fuel containing 3 ml. of a commercial tetraethyllead antiknock fluid.

Fuels were run with and without the product of Example XX. The results are tabulated in Table V.

*Table V*

| Engine No. | Concentration, wt. percent | Combustion Chamber Deposit, mg. | Reduction, Percent |
|---|---|---|---|
| 1 [a] | | 17.8 | |
| 1 | 0.05 | 15.2 | 15 |
| 1 | 0.25 | 7.8 | 56 |
| 2 [b] | | 8.9 | |
| 2 | 0.25 | 4.6 | 48 |
| 3 [a] | | 18.5 | |
| 3 | 0.25 | 7.9 | 57 |
| 4 [b] | | 7.1 | |
| 4 | 0.10 | 5.4 | 24 |
| 4 | 0.25 | 3.7 | 48 |

[a] Indolene fuel (0.016 percent S) plus 3 ml. commercial TEL mix.
[b] Indolene fuel (0.03 percent S) plus 3 ml. of commercial TEL mix.

To contrast these results with those normally obtained with an alkyl phenol, a run was conducted in Engine No. 1 using 0.25 weight percent of a commercial mixture known as "Ethyl 733." This mixture contains about 75 weight percent 2,6-di-tert-butyphenol, 10–15 weight percent 2-tert-butylphenol and 15–10 weight percent 2,4,6-tri-tert-butylphenol and is one of the mixtures used in the preparation, by reaction with formaldehyde, of the products of this invention. The fuel used in the test was Indolene fuel containing 0.016 percent sulfur and 3 ml. commercial TEL mix. The combustion chamber deposit without an additive is the same as that given in the table for Engine No. 1; that is, 17.8 mg. Using the "Ethyl 733" mix the combustion chamber deposits were measured as 17.6 mg. which represents a reduction of only 1.1 percent. Comparing this with the reductions at 0.25 weight percent of the product of this invention of 56, 48, 57 and 48 percent demonstrates the unusual and surprising effectiveness of the products of this invention in reducing combustion chamber deposits.

To illustrate the unusual, surprising and beneficial effects of the products of this invention on reducing the exhaust emissions of a gasoline when used in an engine, exhaust emissions tests were run. In this test Oldsmobile-type single cylinder engines were operated on a mild-duty cycling schedule. Unburned hydrocarbons in the exhaust were measured (as p.p.m. hexane) each 24 hours with a Perkin Elmer Flame Ionization Detector until equilibrium was reached. The fuel was an Indolene fuel (0.016 percent S). The results are given in the following table in which "SOT" represents the emission measured at the start of the test, "EOT" represents the emission measured at the end of the test when equilibrium had been achieved and "Δ Emission" represents the change in emission; that is, the difference between the "SOT" and "EOT" measurements. The additive used was the antioxidant product of Example XX.

*Table VI*

EXHAUST EMISSION TEST

| Engine No. | TEL (ml.) | Scavenger(?) | Concentration of additive, percent | Emission Data, p.p.m. Hexane | | | Reduction, percent |
|---|---|---|---|---|---|---|---|
| | | | | SOT | EOT | Δ Emission | |
| 1 | None | No | None | 525 | 982 | 457 | |
| 1 | None | No | 0.25 | 353 | 851 | 498 | [a] (8.2) |
| 1 | [b] 3 | No | None | 336 | 807 | 471 | |
| 1 | [b] 3 | No | 0.25 | 489 | 835 | 346 | 26.6 |
| 1 | [c] 3 | Yes | None | 475 | 907 | 432 | |
| 1 | [c] 3 | Yes | 0.25 | 481 | 741 | 260 | 40.0 |
| 3 | [c] 3 | Yes | None | 250 | 662 | 412 | |
| 3 | [c] 3 | Yes | 0.25 | 294 | 611 | 317 | 23.0 |

[a] Gain.
[b] Pure TEL.
[c] Commercial TEL mix containing 0.5 theory bromine and 1.0 theory chlorine as ethylene dibromide and ethylene dichloride respectively.

The above demonstrates that a product of this invention effectively reduces the exhaust emission produced when a gasoline containing the product is used. For example, in the test runs on Engine No. 3, fuel without an additive of this invention resulted in 250 parts per million emissions, measured as p.p.m. hexane, at the start of the test (SOT). At the end of test (EOT) the engine gave off an emission value of 662 p.p.m. hexane. The change in emission (Δ Emission) was, therefore, 412 p.p.m. hexane. With 0.25 weight percent of the antioxidant product of Example XX, the start of the test (SOT) emission was 294 p.p.m. hexane, the end of test (EOT) emission was 611 p.p.m. hexane, and the change in emission (Δ Emission) was 317 p.p.m. hexane. The change of emission of 317 as compared to 412 p.p.m. hexane represents a reduction of emission of 23.0 percent.

Reduction in emission was notable only with the presence of tetraethyllead which demonstrates a co-action between the tetraethyllead and the product of this invention. Such a co-action is entirely unexpected and surprising and finds no precedent in the art. The data also reveals that the presence of scavengers have no deleterious effect on this phenomenon.

The compositions of this invention find important utility as antioxidants in a wide variety of oxygen sensitive materials; thus, liquid and solid products derived from petroleum crude are found to possess greatly increased storage stability by the use of an antioxidant of this invention. For example, gasoline, jet fuel, kerosene, fuel oil, turbine oils, insulating oils, motor oils, and various waxes have increased oxidative stability when they contain an antioxidant of this invention. Likewise, liquid hydrocarbon fuels which contain organometallic additives such as tetraethyllead and other organometallic compositions which are used as fuel additives attain appreciably increased oxidative stability by the practice of this invention. Furthermore, such fuels which contain halogen and phosphorus-containing scavengers for these organometallic compounds are benefited by the practice of this invention. In addition to increased storage stability, lubricating oils and functional fluids, such as automatic transmission and hydraulic fluids, both those derived from naturally occurring hydrocarbons and those synthetically prepared, achieve a high degree of resistance to oxidation during use at elevated temperatures by the practice of this invention. It has been found that lubricating oils may be employed at extremely high temperatures without undergoing oxidative degradation when protected by an antioxidant of this invention. The addition of small quantities of the compositions of this invention to such materials as hydraulic, transformer and other highly refined industrial oils as well as crankcase lubricating oils and lubricating greases prepared from these oils by the addition of metallic soaps, greatly increase their resistance to deterioration in the presence of air, oxygen or ozone. Furthermore, the organic soaps used in the preparation of lubricating greases are themselves stabilized by the practice of this invention.

Organometallic compositions such as tetraethyllead and tetraethyllead antiknock fluids containing halohydrocarbon scavengers, dyes and which may contain various phosphorus compounds and other organometallic additives are stabilized against deterioration during storage by the addition thereto of an antioxidant quantity of the compositions of this invention.

The compositions of this invention are also extremely effective antioxidants for elastomers including high molecular weight unsaturated hydrocarbon polymers both derived from naturally occurring sources and those synthetically prepared. Thus, natural rubbers and synthetic rubbers, including oil extended rubbers, are greatly benefited by the practice of this invention. Examples of the synthetic rubbers protected by the practice of this invention include such synthetics as polybutadiene, methyl rubber, polybutadiene rubber, butyl rubber, GR-S rubber, GR-N rubber, piperylene rubber and dimethylbutadiene rubber.

The practice of this invention is also useful in protecting paraffin and micro-crystalline petroleum waxes against the oxidative deterioration which leads to rancidity. Furthermore, the compositions of this invention are extremely useful in the stabilization of fats and oils of animal or vegetable origin which become rancid during periods of storage due to oxidative deterioration. Typical animal fats benefited by the practice of this invention include butter fat, lard, beef tallow, fish oils—such as cod liver oil—as well as various foods containing or prepared in animal fats which tend to deteriorate. These include, for example, potato chips, fried fish, donuts, crackers, and various types of pastry such as cakes and cookies. Furthermore, fat fortified animal feeds and fish meals used as animal feeds are greatly benefited by the practice of this invention. Not only are these compositions protected against oxidative deterioration but the inclusion of a composition of this invention in such materials inhibits the degradation of vitamins A, D and E and certain of the B complex vitamins. Examples of compositions containing oils derived from vegetable sources which are benefited by the practice of this invention include castor oil, soybean oil, rapeseed oil, coconut oil, olive oil, palm oil, corn oil, sesame oil, peanut oil, babassu oil, citrus oils, cotton seed oil and various compositions containing these including peanut butter, peanuts and other whole nuts, salad dressings, margarine and other vegetable shortenings.

The compositions of this invention are also outstanding antioxidants for various organic compounds and polymeric materials including polystyrene, polyvinylchloride, polyvinylacetate, various epoxide resins and polyester resins and polymers including the alkyds. However, in particular the compositions of this invention are outstanding antioxidants for saturated hydrocarbon synthetic polymers derived from polymerization of an aliphatic monoolefin hydrocarbon compound having preferably up to 4 carbon atoms and only a single unit of unsaturation per monomeric molecule. Examples of such monomers include ethylene, propylene, butylene and isobutylene. Thus, the polymers are homopolymers and copolymers of ethylene, propylene, butylene and isobutylene and are usually solid. Polyethylene and polypropylene are preferred polymers in the practice of this invention and they are derived from the polymerization of ethylene and propylene respectively. This polymerization can be accomplished by a great variety of methods which lead to products of diverse properties. The polymers which are employed may be obtained by polymerizing ethylene in a basic aqueous medium and in the presence of polymerization favoring quantities of oxygen under relatively high pressures in excess of 500 or 1,000 atmospheres at temperatures between 150 and 275° C. or they may be the essentially linear and unbranched polymers ordinarily having greater molecular weights obtained under relatively low pressures of 1 to 100 atmospheres by polymerization of ethylene or propylene using such catalysts as mixtures of strong reducing agents and compounds of Groups IVB, VB and VIB metals of the Periodic System; chromium oxide on silicated alumina; hexavalent molybdenum compounds; and charcoal supported nickel-cobalt. The polymers which result from these various polymerization processes may have a molecular weight in the range from 1300 to over 1,000,000 depending on the particular conditions of polymerization employed. However, they are usually solids having molecular weights over 10,000. Whereas all of the above mentioned organic compositions are greatly benefited by the practice of this invention, the preferred embodiments of this invention are those directed to lubricating oils, functional fluids and saturated hydrocarbon polymers such as polyethylene and polypropylene. Although the problems involved in stabilizing these compositions against oxidative deterioration are not equivalent, it has been found that the compositions of this invention give superior results in all of these compositions, probably due to the asymmetric nature of the additives.

The concentration of the antioxidants of this invention in the various organic media is from 0.001 to about 5 weight percent and preferably from 0.01 to 2 weight percent based on the weight of the media.

The following examples are illustrative of the compositions of this invention and their preparation.

EXAMPLE XXII

To 1,000 parts of polyethylene produced by oxygen catalyzed reaction under a pressure of 20,000 atmospheres having an average molcular weight of about 40,000, is added and mixed by milling on hot rolls 2 parts of (3,5-di-tert-butyl-4-hydroxyphenyl) - (3-methyl-5-tert-butyl-4-hydrophenyl)-methane. The resulting composition has greatly increased oxidative stability. Excellent results are also obtained when similar quantities of (3-methyl-5-tert-butyl-4-hydroxyphenyl)-(3,5-dimethyl - 4 - hydroxyphenyl)-methane, (3-methyl-5-tert-butyl-4-hydroxyphenyl)-(3,5-diisopropyl-4-hydroxyphenyl)-methane and the like are employed.

EXAMPLE XXIII

To a master batch of high molecular weight polyethylene having an average molecular weight of about 1,000,000, a tensile strength of about 6,700 p.s.i., a Shore D hardness of 74 and a softening temperature under low load of 150° C. is added 5 percent of a mixture of phenols prepared from 2,6-di-tert-butylphenol and 2-methyl-6-tert-butylphenol as described in Example I. Polyethylene of greatly improved oxidative stability results. Similar results are also obtained when other mixtures containing asymmetric phenols of this invention are employed.

EXAMPLE XXIV

To a wax-line polypropylene having a melting point in excess of 130° C. and a molecular weight of about 4,000, density of 0.913 is added 3 percent of the mixture of methylenebis phenols produced as shown in Example III. The phenolic mixture is added to the polypropylene in the molten state and the mixture is allowed to solidify into the desired shape. A polypropylene product of outstanding oxidative stability results.

EXAMPLE XXV

Linear polyethylene having a high degree of crystallinity and (up to 93 percent) less than one ethyl branch chain per 100 carbon atoms, a density of about 0.96 and about 1.5 double bonds per 100 carbon atoms is treated with $50 \times 10^{-6}$ roentgens of beta radiation. To the thus treated polymer is added 0.01 percent of (3,5-di-tert-butyl-4-hydroxyphenyl)-(3-tert-butyl-4-hydroxyphenyl)methane and the resulting product has greatly improved oxidation stability characteristics due to the presence of the asymmetric phenol of this invention.

EXAMPLE XXVI

To a polyisobutylene polymer having an average molecular weight of 35,000 is added a sufficient quantity of the phenolic mixture prepared as shown in Example II from 2,6-di-tert-butylphenol and 2-methyl-6-tert-butylphenol, to give a composition containing 0.1 percent of the antioxidant. This composition has improved antioxidant properties due to the presence of the phenolic mixture containing the asymmetric methylenebis phenol of this invention.

In addition to the methylenebis asymmetric phenol containing an antioxidant of this invention, the saturated hydrocarbon polymers may contain other compounding and coloring additives including carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

EXAMPLE XXVII

To a synthetic rubber master batch consisting of 100 parts of GR–S rubber having an average molecular weight of about 65,000, 50 parts of mixed zinc propionate stearate, 50 parts of carbon black, 5 parts of road tar, 2 parts of sulfur and 1.5 parts of mercaptobenzothiazole, is added 3 parts of (3-methyl-5-tert-nonyl-4-hydroxyphenyl)-(3,5-di-nonyl-butyl-4-hydroxyphenyl)-methane. This batch is then cured for one hour at 45 p.s.i. of steam pressure to give a rubber having excellent antioxidant properties.

EXAMPLE XXVIII

One part of a liquid mixture prepared from equimolar mixture of 2,6-di-tert-butylphenol and 2-methyl-6-tert-butylphenol according to the procedure outlined in Example II, which mixture contains a substantial portion of 3,5-di-tert-butyl-4-hydroxyphenyl) - (3-methyl-5-tert-butyl-4-hydroxyphenyl)-methane, is blended with the following rubber composition and vulcanized for 60 minutes at 280° F. to produce a highly oxidative resistant natural rubber stock: 100 parts of thick gristly crepe natural rubber, 2 parts of wax, 0.1 part of ultramarine dye, 70 parts of zinc oxide, 20 parts of titanium dioxide, 3 parts of sulfur, 1.2 parts of stearic acid, 0.4 part of benzothiazyl disulfide and 0.5 part of amine activator.

Liquid hydrocarbon fuels employed in the operation of spark ignition combustion engines are also vastly improved in their storage stability by the practice of this invention. Further, other beneficial properties are obtained when the fuel is used in the engine. Products of this invention effectively reduce combustion chamber deposits by as much as 57 percent when used in leaded fuel.

Table VII below gives the compositions of a number of typical commercial gasolines which may be stabilized against oxidative deterioration and provided with superior combustion chamber deposit effects by the inclusion therein of a product of this invention.

*Table VII*

GASOLINE COMPOSITIONS

| Gasoline | Percent Aromatics | Percent Olefins | Percent Saturates | Gravity ° API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

EXAMPLE XXIX

To 1,000 parts of Gasoline A, as described in Table I, is added 10 parts of the product of Example III.

EXAMPLE XXX

To 10,000 parts of Gasoline B is added 50 parts of the product of Example VII.

EXAMPLE XXXI

To 500 parts of Gasoline C, as described in Table I, is added 10 parts of the product of Example XIV.

EXAMPLE XXXII

To 2,000 parts of Gasoline D is added 15 parts of the product of Example XV.

EXAMPLE XXXIII

To 10,000 parts of Gasoline E is added 500 parts of the product of Example XXVI.

Another embodiment of this invention is an antiknock fluid composition adapted for use as an additive to gasoline which composition consists essentially of an organolead antiknock agent, a cyclopentadienyl manganese tricarbonyl or cyclopentadienyl nickel nitrosyl and a product of this invention as defined above, there being present in the composition from about 0.00078 to about 30 parts by weight of manganese or nickel per part of lead and from 0.1 to about 5 weight percent of a product of this invention based on the weight of the organolead antiknock agent. These compositions possess greater stability by virtue of the presence therein of a compound of this invention. Furthermore, these compositions provide an excellent vehicle by which the finished fuels of this invention can be formulated.

The foregoing compositions of this invention can also contain other additives known in the art. Halogen scavengers for the organolead antiknock agents (ethylene dibromide and/or ethylene dichloride, etc.), corrective agents (phosphorus, arsenic and antimony compounds, etc.), dyes, solvents and/or diluents are illustrative of the types of additives which can be co-present.

EXAMPLE XXXIV

To 1,000 gallons of a commercial gasoline having a gravity of 59.0° API, an initial boiling point of 98° F. and a final boiling point of 390° F. are added 3.18 grams per gallon of lead as tetraethyllead, 0.6 theory (based on the lead) of bromine as ethylene dibromide, 1.0 theory (based on the lead) of chlorine as ethylene dichloride, 0.5 gram of manganese per gallon as methylcyclopentadienyl manganese tricarbonyl and 0.0002 weight percent (based on the gasoline) of the product of Example XVII. The resultant fuel possesses enhanced stability characteristics.

EXAMPLE XXXV

With a gasoline having an initial boiling point of 93° F., a final boiling point of 378° F., an API Gravity of 56.2° and a tetraethyllead content equivalent to 0.2 grams of lead per gallon are blended cyclopentadienyl nickel nitrosyl to a concentration of 0.05 gram of nickel per gallon and the product of Example XVIII to a concentration of 0.005 weight percent (based on the gasoline). The finished fuel so formed possesses improved stability properties.

EXAMPLE XXXVI

To a gasoline having an API Gravity of 51.5° F., an initial boiling point of 91° F. and a final boiling point of 394° F. are blended 3.4 grams of lead per gallon as a tetraethyllead, two grams of manganese per gallon as octylcyclopentadienyl manganese tricarbonyl and 0.0008 weight percent (based on the gasoline) of the product of Example XIX. The resultant fuel possesses very good stability.

The compounds of this invention are particularly effective antioxidants for use in steam turbine oils. This is demonstrated by making use of the standard test procedure of the American Society for Testing materials bearing ASTM designation D-943-54. According to this test procedure, 300 ml. of a suitable test oil is placed in contact with 60 ml. of water and the resulting oil-water system is maintained at a temperature of 95° C. while passing oxygen therethrough at a rate of three liters per hour. Oxidation is catalyzed by the use of iron and copper wire. Periodically measurements are made of the acid number of the test oil and failure of an antioxidant is indicated by an acid number in excess of 2.0. It is found that when the various compositions of this invention are added in small antioxidant quantities to steam turbine oils, substantial resistance against oxidative deterioration results.

The compounds of this invention are very effective antioxidants for grease. The potency of the compounds of this invention in this respect is demonstrated by conducting the Norma Hoffman Grease Oxidation Stability Test, ASTM Test Procedure D-942-50. It is found that the presence of minor proportions of the compounds of this invention in conventional greases greatly inhibits oxidative deterioration. By way of example an initially antioxidant-free lithium base grease is modified to the extent that it contains 0.5 percent by weight of the product of Example XIII, and is subjected to the above oxidation stability test. It is found that the presence of the composition produced by the process of this invention greatly retards oxygen absorption by the grease.

The compounds of this invention are outstanding antioxidants for synthetic oils, particularly diester oils of the type described in "Industrial and Engineering Chemistry," 39, 481-91 (1947). Thus, the compounds of this invention can be used to very effectively stabilize diesters formed by the esterification of straight-chain dibasic acids containing from 4 to about 16 carbon atoms with saturated aliphatic monohydric alcohols containing from 1 to about 10 carbon atoms. Generally speaking, diester lubricants that are prepared from branched chain alcohols and which have molecular weights ranging from about 300 to about 600 are especially effective lubricants and are very effectively stabilized by the compounds of this invention. Thus, in the diester lubricant embodiments of this invention, use can be made of oxalates, malonates, succinates, adipates, pimelates, suberates, azelates, sebacates, and the like.

To demonstrate the outstanding utility of the compounds of this invention in diester lubricants, a series of Panel Coking tests are conducted. The Panel Coking apparatus (described in "Lubrication," 40, No. 4 (1954)) is used to qualify synthetic lubricants for jet engines. The method involves the splashing of a lubricant onto a heated aluminum panel which is maintained at a controlled temperature. The weight of deposit formed on the panel is a measure of the oxidation stability of the lubricant. A stringent test consists of operating the panel at a temperature of 600° F. for 10 hours and allowing the splasher to operate for 5 seconds out of each minute. In tests of this nature, the compounds of this invention give an unusually low deposit weight on the panel.

The compounds of this invention very effectively enhance the oxidation resistance of such diester oils as diethyl oxalate; di-sec-butyl malonate; di-(2-hexyl)succinate; di-(isoheptyl)-pimelate; di-sec-amyl glutarate; di-(3-decyl)suberate; di-(isobutyl)glutarate; di-(2-ethylbutyl) glutarate; di-(2-ethylhexyl)glutarate; di-sec-amyl adipate; di-(3-methylbutyl) adipate; di-ethyl adipate; di-2-ethylhexyl adipate; di-sec-amyl azelate; di-(isobutyl)azelate; di-(2-ethylhexyl)azelate; di-sec-amyl sebacate; di-sec-butyl sebacate; di-(2-ethylhexyl) sebacate; the glutarates, adipates, azelates and sebacates of branched chain secondary alcohols, such as undecanol, tetradecanol, etc., and in general diesters of the type described in the literature as useful for synthetic lubricant purposes.

The compositions of this invention are extremely useful as additives to automatic transmisison fluids. By employment of these compositions in automatic transmission fluids, great reductions in the amount of sludge and varnish in the transmission are achieved. Furthermore, the stability of the transmission oil is greatly increased. Automatic transmission fluids ordinarily contain substantial proportions of a refined mineral lubricating oil having carefully selected viscosity characteristics. To fulfill these requirements, the oil is usually distillate oil lighter than an SAE 10 grade motor oil. In addition automatic transmission fluids contain a pour point depressant, a viscosity index improver and may contain various amounts of depressants, so-called anti-squawk agents and various other additives. Transmission fluids containing all of these are greatly benefited by the practice of this invention.

To show the benefits of the practice of this invention in automatic transmission fluids, a series of transmission tests is conducted. The equipment used is a standard modern automatic transmission in which the transmission input shaft is driven at 1800 r.p.m. under no load conditions by an electric motor. The oil sump temperature is controlled at 300° F. by means of a transmission water cooled heat exchanger. The transmission is continuously cycled between a third and fourth gear so that the shift from third to fourth gear occurred every eight seconds. Thus, during each cycle the transmission is in third gear for four seconds and in fourth gear for four seconds. This cycling was accomplished by means of an Eagle multipulse timer utilizing a synchronous motor driven cam which activates a micro-switch and provides a precise eight second signal to the transmission-shifter arm-air-cylinder-solenoid valve. The transmission displaces approximately one quart of fluid from a fluid coupling in the transmission during the shift from third to fourth gear. The displaced fluid is replaced by an equal quantity of air which is taken in and expelled from the transmission case through a vent. Thus, during the test, the fluid is in constant contact with air and is, therefore, much more subject to breakdown and deterioration than a fluid operating in a closed transmission system having no access to air. Each test is carried out for a total of 120 hours. A sample of the transmission fluids is taken every 24 hours for inspection. On completion of the test, the transmission is dismantled and various operating parts are visually inspected for sludge and varnish. The stability of the test oil before, during and after the test is determined by means of used oil analyses. The properties checked are the viscosity increase of the oil and the change in acid number during the test procedure. Tests of this nature conducted on an automatic transmission base fluid containing a substantial proportion of a mineral lubricating oil and a viscosity improver and pour point depressant show conclusively that the compounds and compositions of this invention are extremely effective antioxidants in automatic transmission fluids.

The additive mixtures of this invention are particularly effective in lubricating oil. The lubricating oils used in the practice of this invention include those fractions or blends of fractions from mineral oils which are used for lubricating purposes in the crankcase of an internal combustion engine. Lubricating oil stock is usually considered to include all the distillate obtainable from crude oils after the lower boiling fractions and case oils have been expelled as well as some of the residues that are left in the still when non-asphalt crudes are distilled. Generally lubricating oils are made from distilled fractions of the crude but often these distillate fractions are combined with refined residuum, such as bright stocks, to yield oils having excellent lubricating qualities.

Lubricating oils having a synthetic lubricant base are also used in the practice of this invention. These include silicone-containing oils including the siloxanes and silanes, sebacate esters, fluorocarbon oils, diesters such as di-sec-amyl sebacate and di-(2-ethylhexyl) azelate and synthetic oils such as the polybutene oils, other poly-olefin oils, polyalkylene glycol and tetrahydrofuran polymer oils.

Useable lubricating oils within this invention include those derived from animal, vegetable and mineral stocks. A preferred lubricant base comprises a mineral fraction of lubricating grade derived from refining a crude petroleum oil through a conventional refining process. Such refining processes include distillation, solvent extraction, clay filtration, diwaxing, acid treatment, propane diasphalting, etc. A specific and preferred lubricating oil of this invention is a crankcase lubricating oil for automotive use comprising a hydrocarbon mineral oil having a viscosity range corresponding to the Society of Automotive Engineers classification SAE 5W through 50W.

In a preferred embodiment of this invention lubricating oil is provided containing the antioxidant compositions of this invention.

The following examples in which all parts are by weight illustrate the lubricating oil embodiments of this invention.

EXAMPLE XXXVII

To 10,000 parts of a wholly distilled mixed base, solvent refined lubricating oil having a gravity of 28.9° API, a viscosity grade of SAE 10W–20 and a viscosity index of 135.7 is added 100 parts of the product of Example V.

EXAMPLE XXXVIII

To 1,000 parts of a mixed base, solvent refined lubricating oil containing bright stock and which has an SAE viscosity of 20, an API gravity of 30.5° and a viscosity index of 107.4 is added 0.05 percent of a composition prepared as in Example I from an equimolar mixture of 2,6-diisopropylphenol and 2-tert-butyl-6-isopropylphenol and which contains a large proportion of (3,5-diisopropyl-4-hydroxyphenyl) - (3-isopropyl-5-tert-butyl-4-hydroxyphenyl)-methane.

EXAMPLE XXXIX

To 2,000 parts of a wholly distilled lubricating oil having an API gravity of 30.3° a viscosity index of 154.2 and an SAE viscosity grade of 5W–20 is added 2 percent of (3,5-di-tert-butyl-4-hydroxyphenyl)-(3-tert-butyl-2-hydroxyphenyl)-methane.

In adding an antioxidant of this invention to a mineral lubricating oil, it is often advisable to heat the oil to from up to about 100° C. and agitate the oil while adding the antioxidant.

In the above examples and those which follow, this method is ordinarily resorted to to obtain a homogeneous composition having the additive well dispersed.

EXAMPLE XL

An oxidatively stable lubricating oil is prepared from a wholly distilled lubricating oil base having an API gravity of 29.1, an SAE number of 10W–30, a viscosity index of 138.9 by addition thereto of 5 percent of the product of Example X.

In the finished lubricants of this invention the concentration of the antioxidant can be from 0.001 to 5 weight percent and preferably from 0.01 to 2 weight percent based on the oil.

In other embodiments of this invention the lubricating oil contains additionally other additives compatible with the antioxidant mixtures of this invention and which are non-metallic; that is, do not leave a substantial ash residue upon burning. Such additives include, for example, rust inhibitors, extreme pressure agents and viscosity improvers which are non-metallic.

With conventional hydrocarbon motor oils additives such as barium and calcium sulphonates used primarily for their detergent properties also serve to provide the oil compositions with anti-rust protection. However, certain disadvantages are associated with the use of metallic additives. One important factor is that when such compositions are burned a certain amount of ash residue from the metallic constituents is left in the combustion chamber. Under normal automobile operation varying amounts of lubricating oil by-pass the piston rings and are introduced into the combustion chamber. The ash which is formed from combustion of the metallic additives in the oil is left behind as more volatile combustion products are exhausted. This ash contributes to engine operating problems such as preignition detonation, spark plug fouling, valve burning, etc.

Other additives that are commonly employed which contribute to the ash forming tendency of the oil are antiwear agents such as zinc dialkyldithiophosphates. Such antiwear agents are included in lubricating oil to insure that engine parts such as, for example, the valve train are not subjected to excessive wear. Notable engine parts which are subjected to high loads and thus require antiwear protection above that provided by an additive-free lubricating oil include cam and tappets.

Because of the above deficiencies it is desirable to reduce or eliminate the use of metallic additives in crankcase lubricant oils. Accordingly this embodiment of the invention contemplates that metallic detergents and antiwear agents are replaced with non-metallic materials.

Since detergents of the latter type have essentially no antirusting properties, these compositions require an antirust additive which is non-metallic and thus itself ashless.

Because these deficiencies of metallic additives have been previously recognized, anticorrosion and antiwear agents of the non-metallic type have been developed. However, the performance of these prior art ashless materials has not been entirely satisfactory. Oftentimes these prior art materials have been inadequate in preventing rust and wear under severe operating conditions over a long duration. One outstanding problem has been that these additives are not compatible with each other. Both antiwear and anticorrosion mechanisms are surface-active functions, and in effect the two additives compete for the metallic surface to be lubricated. In some situations, the additives actually display an antagonistic effect. Thus while an antirust additive may itself provide adequate protection, addition of an antiwear agent to the lubricating oil may nullify the antitrust function. Similarly, while an antiwear agent may otherwise provide the desired protection, it may not so function in the presence of an antirust agent.

The art will benefit from a compatible combination of an antiwear agent and an anticorrosion agent which are of the non-metallic type, and which function effectively to produce the required results.

Accordingly, in an embodiment of this invention there is provided lubricating oil compositions containing as essential ingredients an antioxidant composition as described above and a narrow class of phosphonates as anti-wear agents. These phosphonates have the formula:

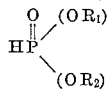

wherein $R_1$ and $R_2$ are hydrocarbon groups containing from 1 to about 12 carbon atoms and are selected from the group consisting of alkyl, cycloalkyl, aryl, aralkyl and alkaryl groups. It is preferred that alkyl be from 1–12 carbon atoms, cycloalkyl be from 5–12 carbon atoms, aryl be from 6–12 carbon atoms, aralkyl be from 7–12 carbon atoms and alkaryl be from 7–12 carbon atoms. It is preferred that $R_1$ and $R_2$ be the same alkyl groups containing from 3 to 8 carbon atoms. It has been found that particularly effective compounds are those having branched alkyl substituents such as, for example, di-sec-butyl phosphonate and bis(2-ethylhexyl)phosphonate.

The above-defined phosphonates have been found to be uniquely suitable for addition to lubricating oil in combination with the antioxidant additives of this invention. Not only do the phosphonates provide outstanding antiwear protection, but they do not interfere with the function of the antioxidant additive. The effectiveness of these phosphonates is surprising for other seemingly similar phosphorus compounds noted for their antiwear properties have been found to be ineffective for the purpose contemplated. Such widely known antiwear agents as tributyl phosphite and tricresol phosphate have been found to be ineffective.

To illustrate the antioxidant effectiveness of the combination of antioxidant and antiwear agent of this invention, an L–38 corrosion test was run. This test is described in the material preceding the data in Table III above. Tests were run using an oil containing 5.0 weight percent of a commercial polymeric detergent without an antioxidant or antiwear agent and other samples were run with the same concentration of the same detergent with 0.4 weight percent of di-sec-butyl phosphonate as an antiwear agent and varying amounts, from 0.3 to 0.8 weight percent, of the antioxidant product of Example III. The polymeric detergent is available from the Rohm and Haas Company under the trade name "Acryloid 917" and believed to be a co-polymer of dimethyl methacrylate and dialkylaminoethyl methacrylate. The results are listed in Table VIII.

Table VIII

L-38 TEST RESULTS [1]

| Concentration of Additive (percent) | | Bearing Weight Loss (mg.) | Hours | |
|---|---|---|---|---|
| Product of Example III | Di-sec-butyl phosphonate | | Acid No. | Viscosity Increase (percent) |
| ---------- | ---------- | [2] 206 | [2] 13.5 | [2] 340 |
| 0.3 | 0.4 | 1 | 1.1 | 49 |
| 0.4 | 0.4 | 1.5 | 1.5 | 57 |
| 0.6 | 0.4 | 3 | 1.2 | 48 |
| 0.8 | 0.4 | 1 | 1.4 | 50 |

[1] Average of two tests unless otherwise noted.
[2] Average of four tests.

The results of these tests, as shown in Table VIII, indicate a much more highly stabilized oil and vastly reduced bearing weight loss resulting from employing the mixture of antioxidant and antiwear agent of this invention.

The concentration of the ashless antiwear additive employed in the finished lubricant is generally about 0.01 to about 2 percent. Preferred concentration range is from about 0.1 to 0.6 weight percent.

The phosphonates of this invention are known compounds and methods for their preparation are well established. See, for example, "Organophosphorus Compounds," G. M. Kosalopoff, John Wiley and Son, Inc., New York, N.Y. and "Industrial and Engineering Chemistry," 49, 1871 (1957).

In another embodiment of this invention there is provided lubricating oil compositions containing as essential ingredients an antioxidant composition as described above and certain pyrrolidine derivatives as non-metallic antirust additives.

The non-metallic anti-rust additives of this invention are substituted pyrrolidines having the formula:

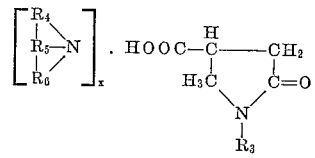

wherein $R_3$ and $R_4$ are aliphatic hydrocarbon groups containing from about 8 to about 25 carbon atoms and having from 0 to 3 double bonds, $R_5$ and $R_6$ are selected from the group consisting of hydrogen and aliphatic hydrocarbon groups containing from about 8 to 25 carbon atoms and having from 0 to 3 double bonds, and $x$ is an integer; namely, 0 or 1. As seen from the above formula, the anti-rust additives of this invention are 1-(aliphatic radical)-3-carboxy-5-oxo pyrrolidines and amine salts of these compounds. The amine salts are the preferred additives and may also be referred to as aliphatic amine 1-(aliphatic radical)-5-oxo-3-pyrrolidinecarboxylates.

Aliphatic hydrocarbon groups $R_3$, $R_4$, and in appropriate cases, $R_5$ and $R_6$ may be saturated or olefinic and may be straight chain or branched. They may be, for example, octyl, nonyl, decyl, etc., up to pentacosyl, inclusive and may be olefinic and branched counterparts of these groups. It is preferred that these aliphatic groups be straight chain olefinic groups containing from 12 to about 20 carbon atoms, and having at least one double bond in the chain.

The substituted pyrrolidines of this invention may be prepared by any suitable manner known to the art and such methods will not be herein discussed in great detail. One suitable method is disclosed in U.S. Patent 2,757,125 which involves heating equimolar amounts of itaconic acid and a primary amine at 180–200° C. There is formed 1-(aliphatic radical-3-carboxy-5-oxo-pyrrolidine as a condensation product with the elimination of water. This compound may be neutralized with at least one molar proportion of a primary, secondary or tertiary amine to form the amine salts of this invention. When it is desired to prepare the amine salt, it is convenient to combine the above two steps and directly react at least two moles of an appropriate aliphatic amine with one mole of itaconic acid to form the amine salt directly. For this reaction, a mixture of primary, secondary and tertiary amines may be used, provided there is present at least one mole of primary amine required to form the heterocyclic pyrrolidine ring. The resulting carboxy pyrrolidine further reacts with either primary, secondary or tertiary amine to form the amine salt of this invention.

While chemically pure amines may be used in the above reaction, to form the pyrrolidine additives of this invention, ordinarily it is preferred to use commercial amines which are mixtures of amines of various chain lengths.

One group of such amines are derived from reduction of fatty acid mixtures such as tallow, soya, palm, and coconut oils. From these fatty acid mixtures and ammonia are derived the corresponding fatty amines. Thus, soya oil yields a mixture of amines having aliphatic hydrocarbon groups containing from 16 to 20 carbons and having from 0 to 3, predominantly 1 and 2, double bonds in the chain. Coconut oil yields a mixture of amines having aliphatic groups which are predominantly saturated having from 8 to 18 carbon atoms in the chain. In commercial practice, these by-product amines are often derived from a mixture of tallow, soya and coconut oils and thus yield a wide range of amine products. Because they are widely available and for economic reasons, these mixtures are preferred.

Ordinarily the above-described reaction of amine with itaconic acid can be carried out without the use of a solvent. However, in some situations the use of an organic solvent such as benzene or ether improves the yield and purity of the product.

The concentration of ashless antirust additive employed in the finished lubricants is, in general, from about 0.01 to about 2.0 percent. However, due to the high effectiveness of the substituted pyrrolidines of this invention, in most applications a concentration from about 0.05 to 0.2 percent is optimum.

The above-described anti-rust additives, antiwear agents and antioxidants are compatible, none of them interfering with the function of the other. To illustrate the effectiveness of the combination of antioxidant, antiwear and anti-rust additives of this invention, L–38 corrosion tests were conducted as described in preceding Table III. Tests were run using an oil containing 2.0 weight percent of a detergent without an antioxidant, antiwear agent or anti-rust agent and other samples were run with the same concentration of the same detergent with 0.4 weight percent of di-sec-butyl phosphonate as an antiwear agent, 0.1 weight percent of an anti-rust agent of this invention obtained by reaction of 2 moles of a mixture of soya, coconut and tallow amines with one mole of itaconic acid, and 0.8 weight percent of the antioxidant product of Example III. The detergent used was a commercially available composition sold by the Oronite Division of the California Chemical Co. under the tradename "Oronite 1200" and is N-dimethylaminopropyl polybutenyl succinimide. The results, which are the average of two tests, are listed in Table IX.

*Table IX*

L–38 TEST RESULTS

| Concentration of Additive (percent) | | | Bearing Weight Loss (mg) | Oil After 40 Test Hours | |
|---|---|---|---|---|---|
| Product of Example III | Di-sec-butyl phosphonate | Antirust | | Acid No. | Viscosity Increase (percent) |
| -------- | -------- | -------- | 432 | 14.5 | -------- |
| 0.8 | 0.4 | 0.1 | 16 | 2.2 | -------- |

The above results demonstrate the effectiveness and compatibility of the combination of antioxidants, antiwear agents and antirust additives of this invention.

In another embodiment of this invention there is provided lubricating oil compositions containing as essential ingredients an antioxidant composition as described above and a member of certain class of detergents. Detergents of this invention generally act both as detergents and dispersants. They function to prevent oxidation products and other constituents from agglomerating and depositing out on various engine parts. Also any insoluble materials which may be formed are dispersed and suspended in the oil, thereby minimizing settling and agglomeration of deposits. These deposits would otherwise interfere with efficient engine operation in that they are responsible for accelerated piston wear, cylinder wall wear and also contribute to oil losses by plugging oil ring grooves.

Certain classes of detergents in combination with the other additives of this invention provide outstanding benefits. One class of detergents is characterized as polymers containing nitrogen substituents. These materials are co-polymers of an essentially non-polar monomer which has the function of contributing to the property of solubility in oil (olephilic monomer) and a monomer containing nitrogen whose function is to contribute to the surface activity of the polymer. Other monomers may be added which are innocuous with respect to these properties and merely serve to extend the polymer chain.

Examples of olephilic monomers are polymerizable polycarboxylic acids, vinyl ethers, vinyl substituted aromatic compounds, esters of unsaturated monocarboxylic and polycarboxylic acids, esters such as alkyl acrylates and methacrylates, alkyl fumarates, dialkyl maleates, etc.

The above type monomers are polymerized with a nitrogen-containing monomer such as vinyl pyridine, vinyl pyrrolidone, dialkylaminoethyl methacrylate, vinyl diethylaminoethyl ether, dialkylaminoethyl styrene, vinyl diethylaminoethyl ether, dimethylaminoalkyl methacrylamide, etc. The ratio of oleophilic monomer to nitrogen-containing monomer is usually at least 1:1 and preferably from about 3:2 to 20:1.

A preferred group of polymers involves polymers of alkyl acrylates and methacrylates with various nitrogen-containing monomers susceptible of polymerizing and containing at least one carbon-to-carbon double bond. These include for example, copolymers of lauryl methacrylate and vinyl pyrrolidone; hexadecyl methacrylate with vinyl pyridine; lauryl methacrylate with vinyl diethylaminoethyl ether; decyl acrylate with dimethylaminomethyl styrene; and also terpolymers wherein a hydrocarbon monomer is included such as the terpolymer of lauryl methacrylate, styrene, and dibutylaminoethyl methacrylate.

One particularly outstanding group of detergents of this invention comprises the copolymers of alkyl methacrylates and a nitrogen-containing monomer selected from the group consisting of dialkylaminoethyl methacrylates, vinyl pyrrolidones, and vinyl pyridines. These polymers have the repeating structure

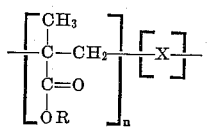

wherein R is an alkyl group having from about 8 to about 25, preferably 12 to 18 carbon atoms, $n$ is an integer ranging from 1 to about 50, X is selected from the group consisting of

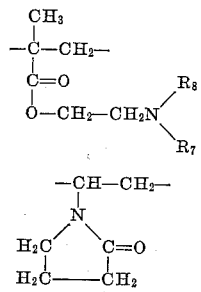

and

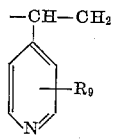

wherein $R_7$ and $R_8$ are alkyl groups having from 1 to about 12, preferably 1 to 8 carbon atoms, and $R_9$ is selected from the group consisting of hydrogen and alkyl groups having from 1 to 12 carbon atoms. These polymers have been found to possess outstanding detergent properties, are compatible with the antirust additives of this invention, and also are viscosity index improvers. The above polymer detergent-dispersants are added to lubricating oil in an amount ranging from 0.1 to about 10 percent, preferably from about 3 to 8 percent.

Another preferred group of detergent-dispersants are N-substituted alkenyl heterocyclic imides. These compounds are obtained by reacting a hydrocarbon polymer, preferably the polymer of an olefin having from 2 to 5 carbon atoms, with an acid anhydride, followed by reaction with a compound having an amino function to form the heterocyclic imide. An outstanding example is a detergent formed by reacting a polyisobutene having a molecular weight of about 200 to 1500 with an acid anhydride such as maleic anhydride to form monoalkenyl succinic anhydride. This material is then reacted with a nitrogen-containing compound such as for example dialkylaminoalkyl amine, to form N-dialkylaminoalkyl monoalkenyl succinimide:

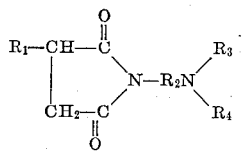

or with N-(aminoalkyl)piperazine to form N-alkylpiperazine monoalkenyl succinimide,

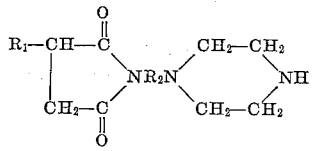

In the above formulae, $R_1$ is a polyolefin radical having a molecular weight of from about 200 to 1500 derived from olefins having from 2 to 5 carbon atoms, $R_2$ is a hydrocarbon group having from 1 to about 5 carbon atoms, and $R_3$ and $R_4$ are alkyl groups containing from 1 to about 12 carbon atoms.

Another class of detergent-dispersants usable in combination with the other additives of this invention are reaction products of higher polyhydric alcohols with carboxylic acids. Especially preferred are reaction products of the hexahydric alcohols mannitol, sorbitol and dulcitol with higher fatty acids having from about 12 to 20 carbon atoms. The reaction of these constituents yields various products depending on the reaction conditions. For example, reaction of sorbitol with a fatty acid in the presence of phosphoric acid at a pH of 1–2 yields sorbide esters, whereas reaction in the presence of sodium hydroxide yields predominantly sorbitan esters. One method of producing these products is disclosed in U.S. Patent 2,322,820.

The most preferred dispersants from the above class are the sorbide esters, especially the monoesters derived from reaction of sorbitol or sorbide with a fatty acid having from 12 to about 20 carbon atoms and containing up to 3 double bonds. Particularly outstanding are the properties of sorbide monooleate. This product is obtained by reaction of sorbitol with oleic acid in the presence of phosphoric acid at a pH of 1–2 at a temperature of from about 150 to 300° C.

Another class of detergents usable in my compositions are alkylphenol-olefin oxide condensation products. The condensation to yield these products is carried out in the presence of a catalyst such as sodium methoxide at temperatures of about 200° C. The molar ratio of phenol to olefin oxide is from about 1:1 to 1:100, preferably from 1:1 to about 1:20. The overall reaction may be represented as follows:

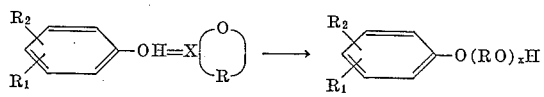

where R is a polymethylene group, preferably ethylene or propylene, $R_1$ is an alkyl group having from 6 to 20 carbon atoms, $R_2$ is selected from the group consisting of hydrogen and alkyl groups having from 6 to 20 carbon atoms, and $x$ is an integer ranging from 1 to 100. A preferred group of detergents are the condensation products of propylene oxide and p-tertiary-octylphenol reacted in a molar ratio of from 1:1 to 20:1.

Certain fatty acid alkanolamides constitute another group of detergents that can be used in combination with the ashless antirust additive. These are the reaction products of equimolar amounts of an alkanol amine with a fatty acid heated at from about 150° to 250° C. for from 1 to 4 hours in a nitrogen atmosphere. These products have the general formula

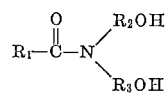

wherein $R_1$ is the organic residue of a straight chain fatty acid containing from 10 to about 20 carbon atoms in the molecule, and $R_2$ and $R_3$ are the same or different and are the organic residue of aliphatic alcohols having from 1 to about 8 carbon atoms in the molecule. Preferred products are those wherein $R_1$ contains from 11 to 17 carbon atoms and $R_2$ and $R_3$ are the same and contain from 2 to 4 carbon atoms. Thus, compounds such as lauric diethanolamide, oleic diethanolamide and linoleic diethanolamide are preferred.

It is to be understood that although specific classes of ashless detergent-dispersant have herein been described, other classes of such additives can be included in the compositions of this invention. Any ashless detergent which is compatible with the antioxidants, antiwear and anti-rust agents of this invention and which has the requisite solubility can be included either in combination with the detergents herein described or in place thereof. The detergents may be of the polymeric type such as alkyl methacrylate-methacrylic acid polymers esterified with polyolefins such as pentaerythritol and polyethylene glycol; of the polyester type such as polyesters of dibasic acids or anhydrides with diethanolamines, i.e., polyesters of alkenylsuccinic anhydride with alkyldiethanolamines; or they may be monomeric compounds such as aromatic dialkanolamines, i.e., mixed xylyl dipropanolamines; etc.

A lubricating oil containing the dispersants and anti-wear agents discussed above together with the antioxidants of this invention form a preferred embodiment of this invention in that such a combination gives rise to results which are highly beneficial. This is surprising and unexpected in view of the fact that detergents and anti-wear inhibitors usually have a deleterious effect on each other. As noted, the competition for the surface of the media is one of the factors for this mutual degradation. In the present invention this degradation is kept at a minimum, the additives being compatible with each other.

Another embodiment of this invention comprises lubricating oil containing an antioxidant, a dispersant and an anti-rust inhibitor as discussed above. Here too the combinations of these materials gives rise to a highly beneficial lubricating oil. The additives are compatible with each other and do not detract from the individual effectiveness of each of the additives.

In a most preferred embodiment of this invention there is provided a lubricating oil as described above containing from 0.001 to about 5 weight percent of an antioxidant, from 0.01 to about 2 weight percent of an anti-wear agent, from 0.01 to about 2.0 weight percent of an anti-rust additive and from 0.1 to about 10 weight percent of a detergent, each of these additives being of those discussed above. The concentration ranges for the various additives are more preferably from 0.01 to about 2 weight percent of the antioxidant, from 0.1 to about 0.6 weight percent of the antiwear agent, from 0.05 to about 0.2 weight percent of anti-rust agent, and from about 3 to 8 weight percent of the detergent. These concentration ranges are, for most of the additive mixtures, optimum. To illustrate the effectiveness of compositions containing the combinations of the 4 additive types of this invention such compositions were subjected to a Sludge Dispersancy Test to evaluate their ability to suspend the insoluble materials found in drains from internal combustion engines. The test was described in the paper "Lubricating Oil Detergents and Dispersants" by R. M. Jolie, presented at the 4th World Petroleum Congress, June 4, 1959. The procedure consists of mixing 1 weight percent of the dispersant to be tested and 2 weight percent of water with a "used" crankcase lubricant. The mixture is then homogenized by mechanical stirring, placed in an ASTM centrifuge tube and centrifuged at 1500 r.p.m. for 2 hours. After centrifuging two layers result; a sediment layer which contains a portion of the original product precipitated from the oil and a supernatant layer which contains the material dispersed by the dispersant. The effectiveness of a dispersant is measured by the relative quantities of precipitated material and the dispersed or suspended material. Rather than a visual grading as suggested by the test as originally described, the test was modified and the upper oil layer is checked for the percentage of light transmittancy in a photometer. The better the dispersant properties of the additive, the lower the amount of light that will be transmitted. The results of this test are shown in Table X.

*Table X*

SLUDGE DISPERSANCY TEST RESULTS

| Blend | Composition, Percent | Light Transmitted, Percent |
|---|---|---|
| A | Base Oil | 74 |
| B | A plus 0.4 di-sec-butyl phosphonate, 0.1 amine salt,[1] 0.9 phenolic antioxidant.[2] | 74 |
| C | B plus 1.0 polymeric detergent.[3] | 7 |
| D | B plus 1.0 imide detergent.[4] | 1 |

[1] Obtained by reaction of two moles of a mixture of soya, coconut, and tallow amines with one mole of itaconic acid.
[2] Product of Example XXI.
[3] Available from the Rohm and Haas Company under the trade name "Acryloid 917" and believed to be a co-polymer of dimethyl methacrylate and dialkylaminoethyl methacrylate.
[4] N-dialkylaminoalkyl monoalkenyl succinimide, sold by the Oronite Division of the California Chemical Company under the trade name "Oronite 1200."

The above data show that compositions C and D which contain the combination of an antioxidant, anti-rust, anti-wear and detergent additive of this invention have outstanding detergent-dispersant properties. These compositions are superior to the base oil or the oil void of a detergent.

To further illustrate the effectiveness of the combination of antioxidant, anti-wear, anti-rust, and detergent additives of this invention L–38 corrosion tests were conducted as described preceding Table III. Tests were run using an oil containing 0.8 percent of the product of Example III, 0.4 percent di-sec-butyl phosphonate, 0.1 percent of an anti-rust agent of this invention obtained by reaction of 2 moles of a mixture of soya, coconut and tallow amines with one mole of itaconic acid and 2.0 percent of N-dimethylaminopropyl polybutenol succinimide (Oronite 1200). Tests were also run on a commercial ashless oil sold by the Shell Oil Co. under the tradename "Shell Premium X-100 Oil" and which contains, by analysis, 0.6 weight percent of 4,4'-methylene-bis(2,6-di-tert-butylphenol) and a detergent, an antiwear agent and an anti-rust agent. The results are listed in Table XI.

*Table XI*

| Composition | Bearing Weight Loss, mg. | Oil After 40 Test Hours | |
|---|---|---|---|
| | | Acid No. | Viscosity Increase, Percent |
| "Shell Premium X-100 Oil"[1] | 110 | 10.5 | 123 |
| Lube Oil plus the 4 additives cited[2] | 28 | 1.5 | 54 |

[1] Average of 8 tests.
[2] Average of 2 tests.

The above results demonstrate the commercial effectiveness of a lubricating oil containing the 4 additives of this invention and its superiority to a commercially available ashless premium lubricating oil.

To further illustrate the commercial effectiveness and acceptability of lubricating oil containing additive combinations of this invention an evaluation was conducted using the General Motors' "MS" technique. This technique is set forth in the General Motors Manufacturing Standards, released in February of 1960. The procedure describes a method for evaluating crankcase oils intended for severe motor service (MS). The test engine, a 1960 Olds V–8 equipped with a two-barrel carburetor, is operated under the test conditions shown in Table XII.

Table XII

ENGINE OPERATING CONDITIONS

| Test Sequence | I | II | III |
|---|---|---|---|
| Engine Speed r.p.m. | 2,500 | 1,500 | 3,400. |
| Engine Load, B.H.P. | None | 25 | 85. |
| Coolant Out Temp.,° F. | 95 | 95 | 200. |
| Coolant In Temp.,° F. | 85 min | 85 min | 190 min. |
| Oil Sump Temp.,° F. | 120 max | 120 | 265. |
| Air-Fuel Ratio | 14:1 | 16:1 | 16:1. |
| Carb. Air Humidity, gr./lb. | 80 | 80 | 80. |
| Engine Cycle: | | | |
| Operated | 10 min | 3 hrs | 36 hrs. |
| Shutdown | 50 min | 3 hrs | |
| No. of Cycles | 30 | 16 | 1. |

Sequence I evaluates the low-temperature anti-scuff performance of the lubricating oil. If inspection of the cams and lifters at the end of this test period show no scuffing or undue wear, the test is continued to the next sequence without oil drain. Sequence II evaluates the low-temperature rusting and corrosion characteristics of the oil. Upon successful completion of this phase, the test is continued to the next sequence without oil drain. Sequence III evaluates the high-temperature oil oxidation characteristics. The engine is dismantled for inspection at the end of this operation.

The fuel used in these tests was standard for this type of testing consisting of a blend of 75 percent aviation and 25 percent motor gasoline. The fuel contained 3.0 ml. of TEL per gallon and had a sulfur content of 0.16 percent (as di-tert-butyl-disulfide), a gravity of 59° API, a Reid vapor pressure at 100° F. of 7.9 lbs., motor and research octane numbers of 95 and 98 respectively and ASTM distillations for the initial boiling point, 10 percent, 50 percent, 90 percent and end point of 105, 152, 208, 260 and 345° F. respectively.

A lubricating oil having a viscosity grade of 10W-30, viscosity SUS values at 100° F. and 210° F. of 345 and 65.3 respectively, a viscosity index of 137, an ash of 0.0069 percent, an acid number of 0.16 and containing 0.059 percent phosphorus was used as the base oil for the additives of this invention. The additives used were 0.9 weight percent of the antioxidant product of Example XX, 0.4 weight percent di-sec-butyl phosphonate, 0.1 weight percent of an antirust agent of this invention obtained by reaction of 2 moles of a mixture of soya, coconut and tallow amines with 1 mole of itaconic acid and 5.5 volume percent of a polymeric detergent, available from the Rohm and Haas Co. under the tradename "Acryloid 917" and believed to be a copolymer of dimethyl methacrylate and dialkylaminoethyl methacrylate. This oil is designated as the "experimental oil." For comparative purposes a GRM reference oil was used as well as a commercial ashless oil sold by the Shell Oil Co. under the tradename of "Shell Premium X100 Oil" which contains, by analysis, 0.6 weight percent of 4,4'-methylenebis(2,6-di-tert-butylphenol) as an antioxidant. It had a viscosity grade of 10W-30, viscosity SUS values at 100° F. and 210° F. of 320 and 63.1 respectively, a viscosity index of 139, an ash of 0.042 percent, an acid number of 0.4 and containing 0.064 percent phosphorus. The results are contained in the following discussion.

VARNISH DEPOSITS

The CRC Deposit Scales are used in evaluating varnish deposition. Selected engine parts are rated for varnish on a rating scale of 10 to 0 in which 10 designates no deposition. Passing this phase of the "MS" test requires that the average piston varnish rating and the average engine varnish rating (all rated parts) indicate no greater varnish deposition than obtained with the GMR reference oil run under the same tets procedure by the same laboratory.

Ratings obtained with the two test oils and with the GMR reference oil, shown in Table XIII, indicate that both oils exceeded the test requirement and with equally light varnish deposition.

Table XIII

VARNISH DEPOSIT RATINGS

[10=Clean]

| Piston Skirts | Experimental Oil | Commercial Ashless Oil | GMR Reference Oil |
|---|---|---|---|
| No. 1 | 9.6 | 9.9 | 9.2 |
| 2 | 9.8 | 9.9 | 9.1 |
| 3 | 9.7 | 9.7 | 9.2 |
| 4 | 9.9 | 9.8 | 9.0 |
| 5 | 9.8 | 9.9 | 9.1 |
| 6 | 9.8 | 9.8 | 9.0 |
| 7 | 9.8 | 9.6 | 8.9 |
| 8 | 9.7 | 9.7 | 9.0 |
| Piston Skirts, Avg. | 9.8 | 9.8 | 9.1 |
| Rocker Arm Cover Plate | 9.9 | 9.9 | 9.2 |
| Lifter Top Cover | 9.9 | 9.9 | 9.0 |
| Cylinder | 9.8 | 9.8 | 9.1 |
| Crankcase Oil Pan | 9.7 | 9.6 | 9.0 |
| Varnish Total | 49.1 | 49.0 | 45.4 |
| Average | 9.8 | 9.8 | 9.1 |

SLUDGE DEPOSITS

The CRC deposit scales are also used for evaluating sludge deposition. Passing this phase of the "MS" test requires that the top cover sludge rating and the average engine sludge rating indicate no greater sludge deposition than shown with the GMR reference oil. As shown in Table XIV both oils exceeded this requirement with equally light sludge deposition. Piston ring sticking, scuffing, or oil ring clogging did not occur with either test oil.

Table XIV

SLUDGE DEPOSIT RATINGS

[10=Clean]

| | Experimental Oil | Commercial Ashless Oil | GMR Reference Oil |
|---|---|---|---|
| Rocker Arm Cover Plate | 9.9 | 9.9 | 9.0 |
| Lifter Top Cover | 9.9 | 9.9 | 9.0 |
| Oil Screen | 10.0 | 10.0 | 10.0 |
| Crankcase Oil Pan | 9.3 | 9.7 | 8.5 |
| Sludge, Total | 39.1 | 39.5 | 36.5 |
| Average | 9.8 | 9.9 | 9.1 |

The engine rust ratings are made using the General Motors rust rating scale which parallels the CRC rating system for sludge and varnish deposits. To pass this portion of the "MS" test the average valve lifter rust rating (body, plunger, and ball check) and the average engine rust rating (all rated parts) must indicate no greater rusting than shown with the GMR reference oil as tested by the same laboratory.

Rust ratings obtained with the test oil, the commercial oil and with the GMR reference oil are compared in Table XV. The experimental oil was superior to the GMR reference oil by a margin of 1 rating number in both valve lifter and engine ratings. Its engine rating was also one rating number better than shown with the commercial ashless oil.

Table XV

RUST RATINGS

[10=No rust]

|  | Experimental Oil |  | Commercial Ashless Oil |  | GMR Reference Oil |  |
|---|---|---|---|---|---|---|
| Valve Lifter Bodies | 8.1 | | 8.0 | | 7.4 | |
| Valve Lifter Plungers | 7.7 | 8.3 Avg. | 7.1 | 7.5 Avg. | 7.0 | 7.3 Avg. |
| Ball Check Valve | 9.1 | | 7.4 | | 7.6 | |
| Push Rods | 7.6 | | 6.4 | | 7.3 | |
| Piston Wrist Pins | 7.8 | | 7.2 | | 7.2 | |
| Cylinder Walls (BRT) | 6.9 | | 6.1 | | 7.1 | |
| Oil Pump Relief Valve | 7.7 | | 6.2 | | 5.2 | |
| Rust, Total | 38.3 | | 33.7 | | 34.1 | |
| Average | 7.7 | | 6.7 | | 6.8 | |

WEAR DATA

Valve lifter, camshaft, and piston ring wear measurements and connecting rod bearing weight loss data are tabulated in Table XVI. These data show that the test oil met all of the wear requirements of the MS test. The average combined camshaft lobe and valve lifter wear measurement of the experimental oil of 0.0025 inch was below the measurement of 0.0031 inch for the commercial oil and safely below the 0.004 inch maximum test specification. Maximum individual combined cam and mating lifter wear measurement of the experimental oil of 0.0039 inch was below the measurement of 0.0045 inch for the commercial oil and well below the 0.006 inch maximum allowable. No scuffing of cam noses or valve lifter foot crowns and no lifter plunger sticking was shown with either test oil. Measurements of cam and lifter wear tended to favor the experimental oil.

There is no specific "MS" requirement with regard to copper-lead connecting rod bearing weight loss but it is important to note that the loss of bearing material with the experimental oil was about one-third of that shown with the commercial oil and was about one-quarter of that of the GMR reference oil.

Total engine oil consumption for the experimental oil was 2.38 quarts which was below the oil consumption of 3.75 quarts for the commercial ashless oil and well below the 4.4 quart maximum allowed.

Table XVI

WEAR DATA—"MS" SEQUENCES I, II AND III—VALVE LIFTER AND CAMSHAFT MEASUREMENTS

| Lifter or Lobe No. | Hydraulic Valve Lifter Wear in.×10,000 | | Camshaft Lobe Wear, in.×10,000 | | Combined Cam and Mating Lifter Wear, in.×10,000 | |
|---|---|---|---|---|---|---|
|  | Exp. Oil | Coml. Oil | Exp. Oil | Coml. Oil | Exp. Oil | Coml. Oil |
| 1 | 10 | 18 | 12 | 9 | 22 | 27 |
| 2 | 9 | 15 | 20 | 12 | 29 | 27 |
| 3 | 13 | 16 | 22 | 14 | 35 | 30 |
| 4 | 8 | 15 | 12 | 13 | 20 | 28 |
| 5 | 8 | 14 | 15 | 16 | 23 | 30 |
| 6 | 10 | 11 | 7 | 20 | 17 | 31 |
| 7 | 10 | 14 | 15 | 18 | 25 | 32 |
| 8 | 11 | 10 | 17 | 18 | 28 | 28 |
| 9 | 10 | 16 | 13 | 2 | 23 | 18 |
| 10 | 10 | 19 | 12 | 20 | 22 | 39 |
| 11 | 18 | 13 | 16 | 32 | 34 | 45 |
| 12 | 7 | 18 | 9 | 9 | 16 | 27 |
| 13 | 6 | 16 | 15 | 16 | 21 | 32 |
| 14 | 6 | 13 | 23 | 18 | 29 | 31 |
| 15 | 14 | 15 | 25 | 24 | 39 | 39 |
| 16 | 13 | 13 | 14 | 15 | 27 | 28 |
| Avg. Wear | 10 | 15 | 15 | 16 | 25 | 31 |

| | Piston Ring Measurements | | | | Connecting Rod Bearing Measurements | | |
|---|---|---|---|---|---|---|---|
| Piston No. | Ring Gap Increase, in.×1,000 | | | | | Copper Lead Bearing Wt. Loss, Grams | |
| | Ring No. 1 | | Ring No. 2 | | | | |
| | Exp. Oil | Coml. Oil | Exp. Oil | Coml. Oil | | Exp. Oil | Coml. Oil |
| 1 | 1 | 3 | 2 | 4 | Bearing No. 1: | | |
| 2 | 2 | 3 | 4 | 3 | Top | 0.024 | 0.051 |
| 3 | 2 | 2 | 3 | 3 | Bottom | 0.016 | 0.045 |
| 4 | 2 | 2 | 3 | 3 | Total | 0.040 | 0.096 |
| 5 | 3 | 3 | 4 | 2 | Bearing No. 8: | | |
| 6 | 2 | 3 | 3 | 3 | Top | 0.022 | 0.074 |
| 7 | 2 | 4 | 3 | 3 | Bottom | 0.017 | 0.053 |
| 8 | 2 | 2 | 3 | 3 | Total | 0.039 | 0.127 |
| | | | | | Avg. Whole Bearing Wt. Loss | 0.040 | 0.112 |

The following examples in which all parts are by weight further illustrate embodiments of this invention.

EXAMPLE XLI

To 850 parts of a phenol-treated, mixed base mineral oil having a viscosity of 300 Saybolt Universal Seconds (SUS) at 100° F. and 52 SUS at 210° F. and having a viscosity index (VI) of 102, is added 10 parts of the antioxidant product of Example XVI, 20 parts of nonylamine 1-nonyl-5-oxo-3-pyrrolidinecarboxylate, 20 parts of dicyclohexyl phosphonate, and 100 parts of a copolymer of lauryl methacrylate and N-vinyl pyrrolidone. The resulting mixture is stirred to assure homogeneity. The finished lubricant contains approximately 1 percent of the antioxidant product of Example XVI, 2 percent of the amine salt, 2 percent of the phosphonate, and 10 percent of the polymeric detergent.

EXAMPLE XLII

The procedure of Example XLI is repeated using 50 parts of the antioxidant product of Example XX, 50 parts of laurylamine 1-lauryl-5-oxo-3-pyrrolidinecarboxylate, and 10 parts of diphenyl phosphonate. The finished lubricant contains approximately 5 percent of the antioxidant product of Example XX, 5 percent of the amine salt and 1.0 percent of the phosphonate.

EXAMPLE XLIII

To 991 parts of a solvent-extracted Pennsylvania bright stock having a Saybolt viscosity at 100° F. of 660 and at 210° F. of 76, and having a viscosity index of 107, are added 4 parts of the antioxidant product of Example XXI, 1 part of 1-(9-octadecenyl)-3-carboxy-5-oxo-pyrrolidine and 4 parts of dibutyl phosphonate. After physical agitation the finished lubricant contains about 0.1 percent of the pyrrolidine, 0.4 part of the antioxidant and about 0.4 percent of the phosphonate.

EXAMPLE XLIV

Ten parts of pentacosylamine 1-pentacosyl-5-oxo-3-pyrrolidinecarboxylate, 0.1 part of the antioxidant product of Example III, 5 parts of dibenzyl phosphonate and 985 parts of a conventionally refined Pennsylavina bright stock having a Saybolt viscosity at 100° F. of 550 SUS and at 210° F. of 65 SUS, a viscosity index of 100 are intimately mixed. The homogeneous finished oil contains approximately 1 percent of the amine salt, 0.001 percent of the antioxidant and 0.5 percent of the phosphonate.

EXAMPLE XLV

The procedure of Example XLIII is repeated using 9 parts of the antioxidant product of Example XXI, 4 parts of di-sec-butyl phosphonate and 1 part of a mixture of various amine pyrrolidinecarboxylates. The amine product is obtained from reaction of 2 moles of a mixture of soya, coconut and tallow amines with 1 mole of itaconic acid. The resulting amine product is a mixture of aliphatic amine 1-(aliphatic radical)-5-oxo-3-pyrrolidinecarboxylates. The aliphatic amine portion of the salt is derived from a mixture of primary and secondary amines whose aliphatic hydrocarbon groups contain from 12 to 20 carbon atoms and up to three double bonds. The aliphatic radical bonded to the heterocyclic nitrogen atom is derived from a mixture of primary aliphatic amines having from 12 to about 20 carbon atoms and up to three double bonds. The finished lubricant contains 0.9 percent of the antioxidant, 0.1 percent of the amine salt mixture and 0.4 percent of the phosphonate.

EXAMPLE XLVI

To the composition of Example XLV is added 100 parts of the copolymer of lauryl methacrylate and diethylaminoethyl methacrylate. The finished lubricant contains approximately 0.9, 0.1, 0.4 and 10 percent of antioxidant, antirust, antiwear and detergent additives of this invention, respectively.

EXAMPLE XLVII

To the composition of Example XLIII is added 30 parts of N-dimethylaminopropyl polybutyleneyl succinimide. The finished composition contains approximately 0.4 percent of the antioxidant, 0.1 percent of the antirust additive, 0.4 percent of the antiwear agent and 3 percent of the imide detergent.

EXAMPLE XLVIII

To the composition of Example XLV is added 40 parts of sorbide monooleate. After mixing, the finished lubricant contains approximately 0.9 percent of the antioxidant, 0.1 percent of the antirust additive, 0.4 percent of the phosphonate and 4 percent of the detegent.

EXAMPLE XLIX

To 950 parts of di-2-ethylhexyl sebacate are added 5 parts of the antioxidant product of Example IV, 5 parts of 1-(9-octadecenyl)-3-carboxy-5-oxo-pyrrolidine, 20 parts of dibutyl phosphonate, and 20 parts of lauric diethanolamide. The finished lubricant contains 0.5 percent of the antioxidant, 0.5 percent of the antirust additive, 2 percent of the antiwear additive and 2 percent of the detergent.

EXAMPLE L

To 940 parts of polyalkylene glycol is added 6 parts of the antioxidant product of Example XIX, 1 part of 9-octadecenylamine 1-(9-octadecnyl)-5-oxo-3-pyrrolidinecarboxylate, 5 parts of bis(2-ethylhexyl)phosphonate, and 50 parts of the condensation product of p-tert-octylphenol with propylene oxide reacted in a molar ratio of 1:6. The finished lubricant contains approximately 0.6 percent of the antioxidant, 0.1 percent of the antirust additive, 0.5 percent of the phosphonate and 5 percent of the detergent.

EXAMPLE LI

To 440 parts of a contventionally refined Pennsylavina bright stock having a Saybolt viscosity at 100° F. of 570 SUS and at 210° F. of 60 SUS and a viscosity index of 100, are added 180 parts of the antioxidant product of Example XVIII, 20 parts of a mixture of various amine pyrrolidinecarboxylates, 80 parts of di-sec-butyl phosphonate and 280 parts of a polymeric detergent. The amine salt is the product obtained from reaction of soya, tallow and coconut amines with itaconic acid as defined in Example I. The detergent is a copolymer of lauryl methacrylate and N vinyl pyridine. The finished composition comprises lubricating oil containing approximately 15 percent of the antioxidant, 2 percent of the amine salt, 8 percent of the phosphonate and 28 percent of the detergent.

EXAMPLE LII

To 625 parts of the base oil of Example LI is added 20 parts of the antioxidant product of Example XVII, 15 parts of 1-(9-octadecenyl)-5-carboxy-5-oxo-pyrrolidine, 30 parts of bis(2-ethylhexyl) phosphonate and 330 parts of N-dimethylaminopropyl polyisobutene succinimide. The resulting composition comprises mineral oil containing approximately 2 percent of the antioxidant, 1.5 percent of the amine salt, 3 percent of the phosphonate and 33 percent of the detergent.

The antioxidant, antirust and antiwear agents and the detergent-dispersants of this invention, while being highly suitable for addition directly to the finished lubricating oil, may also be incorporated into "ashless packages." Such packages are concentrates of various ashless additives dispersed in oil to be added as a whole to the finished lubricating oil. Thus an embodiment of this invention is an ashless concentrate comprising a carrier oil, preferably mineral oil, containing a high concentration of an antioxidant, an antiwear agent and an antirust additive and also oil containing a combination of these additives and a detergent-dispersant of this invention. The oil may contain as high as 50 percent additives, depending on the solubility of the particular additives employed. Usually it is preferred to use concentrates wherein the combination of additives are present in a concentration of from about 20 to 80 weight percent. Examples of such concentrates are shown by Examples LI and LII above.

To illustrate the unexpected advantages of the "ashless" characteristics of the lubricating oil compositions of this invention, tests were conducted to measure the phenomenon known as Deposit-Induced Runaway Surface Ignition (DIRSI). DIRSI is a form of abnormal combustion. It is a case in which the flame is started by hot deposits and becomes initiated earlier and earlier in the cycle. If allowed to persist, DIRSI may ultimately result in structural damage to the engine. Holes in pistons, scoring of cylinder walls and burning of valves are common aftereffects of DIRSI. The phenomenon of DIRSI has often been referred to as "runaway preignition."

To evaluate DIRSI a CLR single cylinder engine with a 9.75 to 1 compression ratio was used. Deposits were accumulated in the engine according to the following accumulation schedule.

| | Deposit Accumulation Schedule | |
|---|---|---|
| Time, sec | 50 | 150 |
| Speed, r.p.m | 1,200 | 3,000 |
| Load, percent | (1) | 50 |
| Air-Fuel Ratio | 11.5 | 14.0 |
| Ignition, ° B.T.C | 20 | 20 |
| Jacket Temperature, ° F | 260 | 260 |
| Carburetor Air Temp., ° F | 150 | 150 |

1 No load idle.

The deposits were accumulated using an Indolene fuel with 3 ml. of a commercial TEL mix. Every 24 hours during deposit accumulation the fuel was rated using benzene as the rating fuel. Benzene was used because it gives better repeatability than the commercial type test fuel and because DIRSI occurs earlier with benzene than with the test fuel. Both fuels have octane qualities well above the octane requirement of the engine during the rating periods. The rating schedule is as follows.

Rating [1] schedule

| | |
|---|---|
| Time, sec. | 240 |
| Speed, r.p.m. | 3000+ |
| Load | Wide Open Throttle |
| Air-fuel ratio | 13.0 |
| Ignition, ° B.T.C. | 25 |
| Jacket temperature, ° F. | 260 |
| Carburetor air temp., ° F. | 150 |

[1] Rated once each 24 hours.

Oil consumption was controlled by means of a small jet installed in the injecter line which was connected to the high pressure outlet on the oil pump. Consumption was controlled at about 28 ml. of oil per hour which, at an assumed 6 miles per gallon of gasoline, would be equivalent to 300 miles per quart of oil.

DIRSI is preceded by violent bursts of wild ping and/or rumble. These irregularities usually caused small but not significant fluctuations in dynamometer beam load. When DIRSI occurred the beam dropped quite rapidly to at least the 50 percent point and this was considered to be the failure point due to DIRSI.

Oil containing metallic additives and oil containing additives of this invention were tested as described above. The metallic additive containing oil was a Texaco SAE 30 base oil containing a commercial additive sold under the trade name "Lubrizol 1360" (0.08 percent P, and 0.08 percent Zn) and a commercial additive sold under the trade name "Paranox 64" (0.45 percent Ba and 0.05 percent Ca). The oil containing the additives of this invention was a Texaco SAE 30 base oil and the additives were 0.9 weight percent of the antioxidant product of Example XX, 0.4 weight percent di-sec-butyl phosphonate, 0.1 weight percent of an amine salt obtained by the reaction of 2 moles of a mixture of soya, coconut and tallow amines with 1 mole of itaconic acid, and 2.0 weight percent of N-dialkylaminoalkyl monoalkenyl succinimide sold by the Oronite Division of the California Chemical Co. under the trade name "Oronite 1200." The results are listed.

| Blend | Time to DIRSI, hours[1] | |
|---|---|---|
| Oil containing metallic additives | 94 | 107 |
| Oil containing the ashless additives of this invention | 190 | [2] 204 |

[1] Results are given for duplicate tests.
[2] Tests were stopped after approximately twice the time at which the metal additive-containing oil had reached DIRSI. DIRSI was not obtained with either of the oils containing the additives of this invention.

It can be seen from the above data that a large advantage of the ashless additives of this invention lies in their ability to reduce deposit induced runaway surface ignition as compared with oils containing commercial additives but which contain substantial amounts of metal.

The compositions of this invention can also contain other additives commonly used in the lubricant art to improve various characteristics of lubricants. While greatest benefits are obtained from oil compositions completely free of metallic additives, the additives of this invention are still effective in oils containing significant amounts of metal-containing additives and can be so used. With crankcase lubricants, some of the metallic additives that may be used include metal carbamates such as zinc dibutyldithiocarbamate; metal salts such as calcium cetylphenate; dispersant-detergents such as sulfonate or phenate salts of barium or calcium; antiwear agents such as dialkyltin sulfides, lead naphthanate, etc. While in some cases amounts of metal-containing additives may be employed, the preferred crankcase lubricants are completely free of metallic additives.

Other ashless additives that can be incorporated into the concentrate or added directly to the oil include among others viscosity index improvers. Typical of such viscosity index improvers are polymerized olefins or iso-olefins, butylene polymers and alkylated styrene polymers. A butene polymer is typified by the structure:

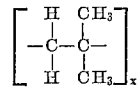

where "$x$" is the number of molecules of similar structure that are condensed to form a high molecular weight polymer. The mean molecular weight of the above polymer is in the order of 10,000 to 15,000. Thus, the value of "$x$" ranges from about 180 to about 270 which is equivalent to about 700 to about 900 carbon atoms per molecule.

Other examples of typical viscosity index improvers are the polymers of the esters of methacrylic acid and higher fatty alcohols. A typical formula for this type of additive which also has pour point depressant properties is

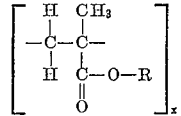

where "R" is a higher fatty alcohol radical such as cetyl or lauryl and "$x$" is the number of molecules having similar structures which are condensed together to form a high molecular weight polymer. This particular class of additives is found very useful since the additive performs both the function of a pour point depressant and a viscosity index improver. The mean molecular weight for these additives ranges from about 5,000 to about 20,000.

Commercial viscosity index improvers are generally formed by blending from about 20 to about 50 percent by weight of the polymeric materials defined above with light mineral oil. This facilitates handling and blending. All of the viscosity index improvers have certain physical properties in common. They have high viscosities which range from about 20,000 to about 60,000 SUS at 100° F. and from about 1500 to about 3500 SUS at 210° F. Their flash points range from about 330 to 450° F. and their pour points range from about 15 to about 35° F.

Metal deactivators may also be included in my compositions. This class of compounds may act by either precipitating dissolved metal ions out of the oil or by forming inactive complexes with the metal compounds. Also, the deactivator may function passively by forming an inactive film on the metal surface. Commonly used metal deactivators include complex amines and sulfides, mercapto-benzothiazole and zinc dibutyldithiocarbamate. Concentrations of these addtives usually range from about 0.05 to 0.2 weight percent.

Pour point depressants are used to prevent growth and crystallization of waxy constituents at reduced temperatures thereby lowering the pour point of the oil. Commonly used materials for this purpose include complex condensation products of paraffin wax and naphthalene, prepared by chlorinating the wax and condensing it with naphthalene by Friedel-Crafts reaction; condensation products of chlorinated wax with phenols; high molecular weight polymerization products of esters of methacrylic acid and higher fatty alcohols such as cetyl, lauryl, etc.

Our compositions may also contain foam inhibitors to prevent formation of stable foams. An outstanding example are the silicone polymers. In addition, other additives such as dyes and color stabilizers may be included in the compositions. The latter materials include certain hydroquinones, dithiocarbamates, aliphatic amines, dicyclohexyl amines, etc.

I claim:
1. A phenolic composition comprising a major amount of a mixture of methylenebis phenols, said mixture comprising (1) a substantial amount of at least one symmetrical methylenebis phenol having identically substituted phenol radicals and having the formula:

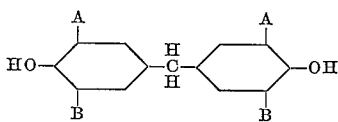

wherein A is a tert-alkyl group having from 4 to about 9 carbon atoms and B is selected from the group consisting of hydrogen and alkyl groups having up to 9 carbon atoms and (2) a substantial amount of at least one asymmetrical methylenebis phenol having different phenol radicals, each of said phenol radicals having from 1 to 2 alkyl groups of up to 9 carbon atoms each, at least one of said alkyl groups being a tertiary alkyl group of from 4 to 9 carbon atoms.

2. The composition of claim 1 wherein said tertiary alkyl group is a tertiary butyl group and said asymmetrical methylenebis phenol has at least one ortho tertiary butyl group on each phenol ring.

3. A phenolic composition comprising a major amount of a mixture of methylenebis phenols, said mixture comprising (1) a substantial amount of 4,4'methylenebis(2,6-di-tert-butylphenol) and (2) a substantial amount of at least one asymmetric methylenebis phenol selected from (3,5-di-tert-butyl - 4-hydroxyphenyl) - (3-tert-butyl-4-hydroxyphenyl) - methane and (3,5-di-tert-butyl-4-hydroxyphenyl)-(3-tert-butyl-2-hydroxyphenyl) methane.

4. The composition of claim 3 wherein said symmetrical methylenebis phenol is 4,4'-methylenebis(2,6-di-tert-butylphenol) and is present in a maximum of 68 weight percent.

5. The composition of claim 4 additionally containing:

as maximum amounts, 1.0 weight percent 2,6-di-tert-butylphenol and 1.5 weight percent 2-tert-butylphenol; and from 2.8 to 9.0 weight percent 2,4,6-tri-tert-butylphenol.

6. The composition of claim 3 additionally containing from 2.8 to 9.0 weight percent 2,4,6-tri-tert-butylphenol and, as maximum amounts, 1.0 weight percent 2,6-di-tert-butylphenol and 1.5 weight percent 2-tert-butylphenol.

7. Organic material normally subject to oxidative deterioration, selected from the class consisting of liquid petroleum hydrocarbon, petroleum wax, petroleum grease, rubber, fats and oils of animal and vegetable origin, tetraalkyllead, antiknock fluid, synthetic diester oil and saturated hydrocarbon synthetic polymers, containing the phenolic composition of claim 1.

8. Organic material normally subject to oxidative deterioration, selected from the class consisting of liquid petroleum hydrocarbon, petroleum wax, petroleum grease, rubber, fats and oils of animal and vegetable origin, tetraalkyllead, antiknock fluid, synthetic diester oil and saturated hydrocarbon synthetic polymer, containing the phenolic composition of claim 3.

9. The composition of claim 8 wherein said organic material is lubricating oil.

10. Lubricating oil containing from 0.001 to about 5 weight percent of the phenolic composition of claim 6.

11. The lubricating oil containing from 0.001 to about 5 percent by weight of the phenolic composition of claim 3 and from 0.01 to about 2 percent by weight of a phosphonate having the formula:

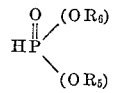

wherein $R_5$ and $R_6$ are hydrocarbon groups containing from about 1 to about 12 carbon atoms and are selected from the group consisting of alkyl, cycloalkyl, aryl, aralkyl and alkaryl groups.

12. The lubricating oil of claim 10 additionally containing from 0.01 to about 2 percent by weight of a dialkyl hydrogen phosphonate in which each alkyl group has from 3 to 8 carbon atoms.

13. An antiknock fluid composition for addition to gasoline comprising an organolead compound and a halohydrocarbon scavenger therefor, containing from 0.001 to about 5 weight percent of the phenolic composition of claim 4.

14. An antiknock fluid composition for addition to gasoline comprising a tetraalkyllead compound and halohydrocarbon scavenger therefor containing from .001 to about 5 weight percent of the phenolic composition of claim 1.

15. An antiknock fluid composition, for addition to gasoline, comprising a tetraalkyllead compound and a halohydrocarbon scavenger therefor, containing from 0.001 to about 5 weight percent of the phenolic composition of claim 3.

16. Gasoline containing from 0.001 to about 5 weight percent of the phenolic composition of claim 1.

17. Gasoline containing an organolead antiknock agent and from 0.001 to about 5 weight percent of the phenolic composition of claim 3.

18. Gasoline containing an organolead antiknock agent and from 0.001 to about 5 weight percent of the phenolic composition of claim 4.

References Cited by the Examiner
UNITED STATES PATENTS

| | | | |
|---|---|---|---|
| 2,285,855 | 6/42 | Downing et al. | 252—49.8 |
| 2,559,932 | 7/51 | Briggs et al. | 260—619 |
| 2,775,620 | 12/56 | Williamson | 260—619 |
| 2,829,175 | 4/58 | Bowman et al. | 252—52 X |
| 2,862,976 | 12/58 | Dubbs et al. | 252—52 X |

(Other references on following page)

UNITED STATES PATENTS

| | | | |
|---|---|---|---|
| 2,908,711 | 10/59 | Halter et al. | 252—51.5 |
| 2,944,086 | 7/60 | Coffield et al. | 260—619 |
| 2,947,789 | 8/60 | Ambelang | 260—619 |
| 2,956,018 | 10/60 | Carlyle et al. | 252—18 |
| 2,958,660 | 11/60 | Edgard et al. | 252—32.7 |
| 2,999,842 | 9/61 | Csendes | 252—404 X |
| 3,018,247 | 1/62 | Anderson et al. | 252—51.5 |
| 3,043,775 | 7/62 | Coffield et al. | 252—52 |
| 3,068,198 | 12/62 | Haines et al. | 260—619 |

FOREIGN PATENTS 799,037  7/58  Great Britain.

DANIEL E. WYMAN, *Primary Examiner*.

UNITED STATES PATENT OFFICE
CERTIFICATE OF CORRECTION

Patent No. 3,211,652                     October 12, 1965

James B. Hinkamp

It is hereby certified that error appears in the above numbered patent requiring correction and that the said Letters Patent should read as corrected below.

Column 3, line 20, for "-demthyl-" read -- -dimethyl- --; column 4, line 36, for "-butylphenyl)" read -- -butylphenol --; column 5, line 44, for "containing" read -- contains --; column 8, line 7, for "-methylenebis$_1$2,6-" read -- -methylenebis(2,6- --; column 21, line 28, for "0.5" read -- 0.25 --; column 26, Table VIII, heading to the third main column thereof, for "Hours" read -- Oil after 40 Test Hours --; column 27, line 7, after "radical" insert a closing parenthesis; column 28, Table IX, heading to the third column thereof, for "Antirust" read -- Antirust Additive --; column 29, lines 27 to 32, for that portion of the formula reading "-$\overset{|}{C}$H-CH$_2$" read -- -$\underset{|}{\overset{|}{C}}$H-CH$_2$- --.

Signed and sealed this 18th day of October 1966.

(SEAL)
Attest:

ERNEST W. SWIDER                       EDWARD J. BRENNER
Attesting Officer                    Commissioner of Patents